(12) United States Patent
Katsuragawa

(10) Patent No.: US 9,857,659 B2
(45) Date of Patent: Jan. 2, 2018

(54) LASER DEVICE

(71) Applicant: The University of Electro-Communications, Tokyo (JP)

(72) Inventor: Masayuki Katsuragawa, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 0 days.

(21) Appl. No.: 15/344,701

(22) Filed: Nov. 7, 2016

(65) Prior Publication Data

US 2017/0052426 A1 Feb. 23, 2017

Related U.S. Application Data

(63) Continuation of application No. PCT/JP2015/063842, filed on May 7, 2015.

(30) Foreign Application Priority Data

May 7, 2014 (JP) .................................. 2014-096297
May 7, 2014 (JP) .................................. 2014-096303

(51) Int. Cl.
 *G02F 1/35* (2006.01)
 *G02F 1/355* (2006.01)
 (Continued)

(52) U.S. Cl.
 CPC .................. *G02F 1/35* (2013.01); *G02B 5/30* (2013.01); *G02F 1/355* (2013.01); *H01S 3/10* (2013.01); *H01S 3/005* (2013.01)

(58) Field of Classification Search
 CPC ... G02F 1/35; G02F 1/355; G02B 5/30; H01S 3/005; H01S 3/10
 See application file for complete search history.

(56) References Cited

U.S. PATENT DOCUMENTS 3,982,135 A * 9/1976 van der Ziel .......... B82Y 20/00
                                                            359/328
4,397,527 A   8/1983 Geyer
                     (Continued)

FOREIGN PATENT DOCUMENTS

FR         2466027         3/1981
JP       06265950 A   *   9/1994   ............... G02F 1/37
                     (Continued)

OTHER PUBLICATIONS

International Search Report dated Aug. 4, 2015.
(Continued)

*Primary Examiner* — Daniel Petkovsek
(74) *Attorney, Agent, or Firm* — IPUSA, PLLC

(57) ABSTRACT

A laser device includes a light source that radiates a laser beam having one or more frequencies, and a nonlinear optical medium on which the laser beam is incident, the non-linear optical medium including at least one dispersive medium that is transparent and arranged along a direction in which the laser beam is radiated. The nonlinear optical medium drives a nonlinear optical process including generation of laser beams having different frequencies. The at least one dispersive medium has an effective thickness that causes a relative phase relationship among all the laser beams relevant to the nonlinear optical process to approximately satisfy a predetermined value.

5 Claims, 19 Drawing Sheets

(51) Int. Cl.
*G02B 5/30* (2006.01)
*H01S 3/10* (2006.01)
*H01S 3/00* (2006.01)

(56) References Cited

U.S. PATENT DOCUMENTS

| | | | |
|---|---|---|---|
| 5,377,212 | A | 12/1994 | Tatsuno et al. |
| 5,467,214 | A | 11/1995 | Heflinger et al. |
| 5,737,082 | A | 4/1998 | Itatani et al. |
| 6,064,510 | A | 5/2000 | Gottlieb et al. |
| 6,300,954 | B1 | 10/2001 | Sato et al. |
| 2007/0070484 | A1 | 3/2007 | Nagano et al. |
| 2010/0054105 | A1 | 3/2010 | Handa |
| 2014/0133004 | A1 | 5/2014 | Wada et al. |

FOREIGN PATENT DOCUMENTS

| | | |
|---|---|---|
| JP | 2007-268581 | 10/2007 |
| JP | 2010-054915 | 3/2010 |
| JP | 2010-171194 | 8/2010 |
| JP | 2013-003277 | 1/2013 |

OTHER PUBLICATIONS

M. Katsuragawa, et al., "Raman gain measurement in solid parahydrogen", Optics Letters, Feb. 1, 2000, vol. 25, No. 3, pp. 177-179.

T. Suzuki, et al., "Spectral phase measurements for broad Raman sidebands by using spectral interferometry", Optics Letters, Dec. 1, 2008, vol. 33, No. 23, pp. 2809-2811.

Nature Physics 3, 381, 2007, P.B. Corkum, F. Krausz, "Attosecond Science", 2007.

Nature Photonics 5, 655 2011, G. Sansone et. al., "High-energy Attosecond Light Sources", 2011.

U.S. Office Action for U.S. Appl. No. 15/618,547 dated Jul. 24, 2017.

\* cited by examiner

FIG.2A
scheme and setup
STEP. 1 Coherence driving
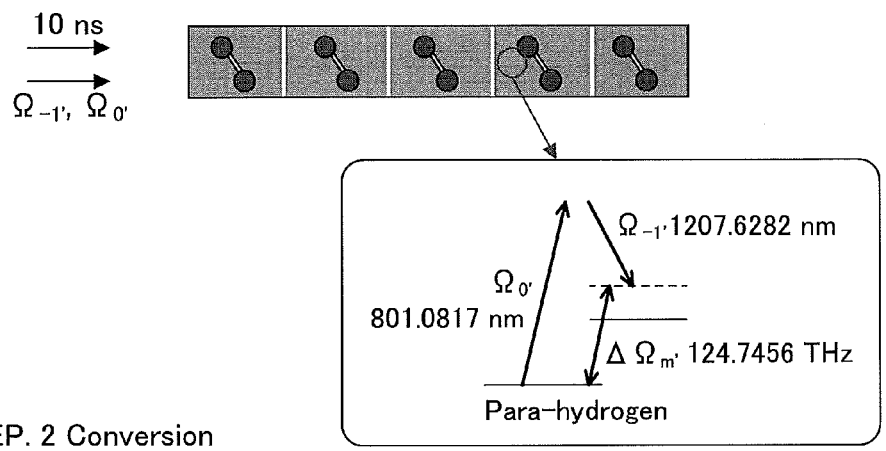
STEP. 2 Conversion
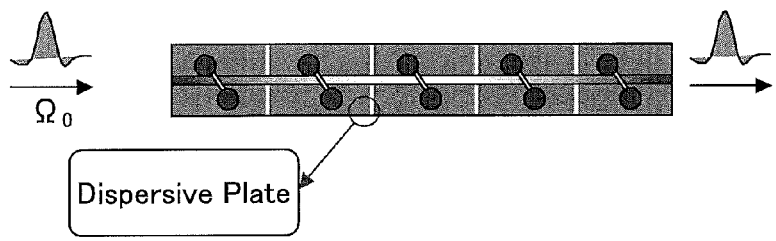
FIG.2B
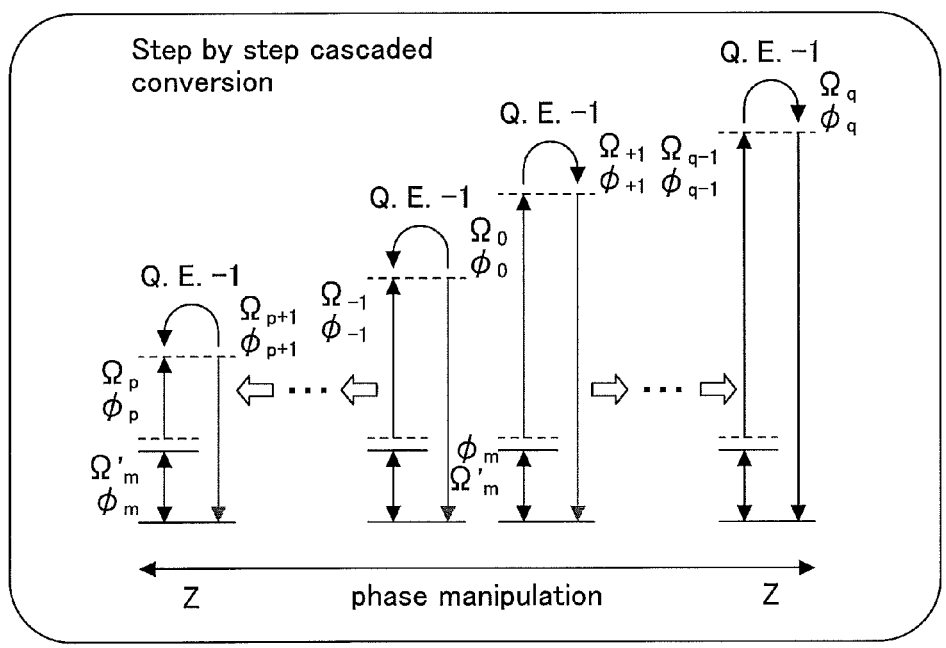

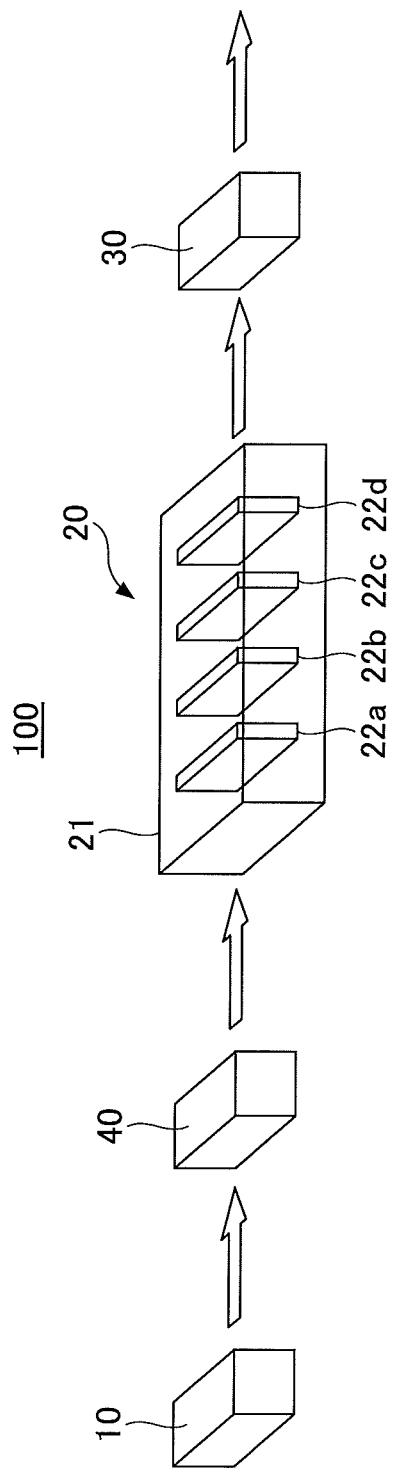

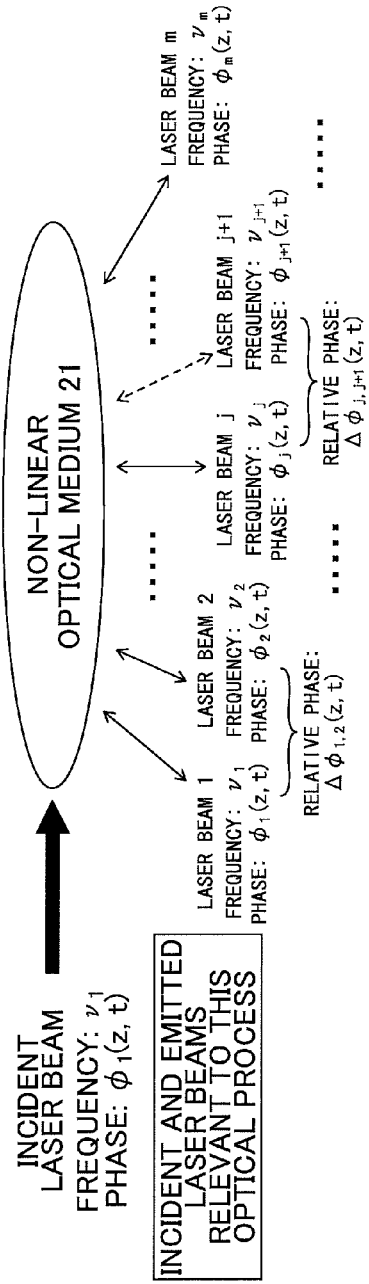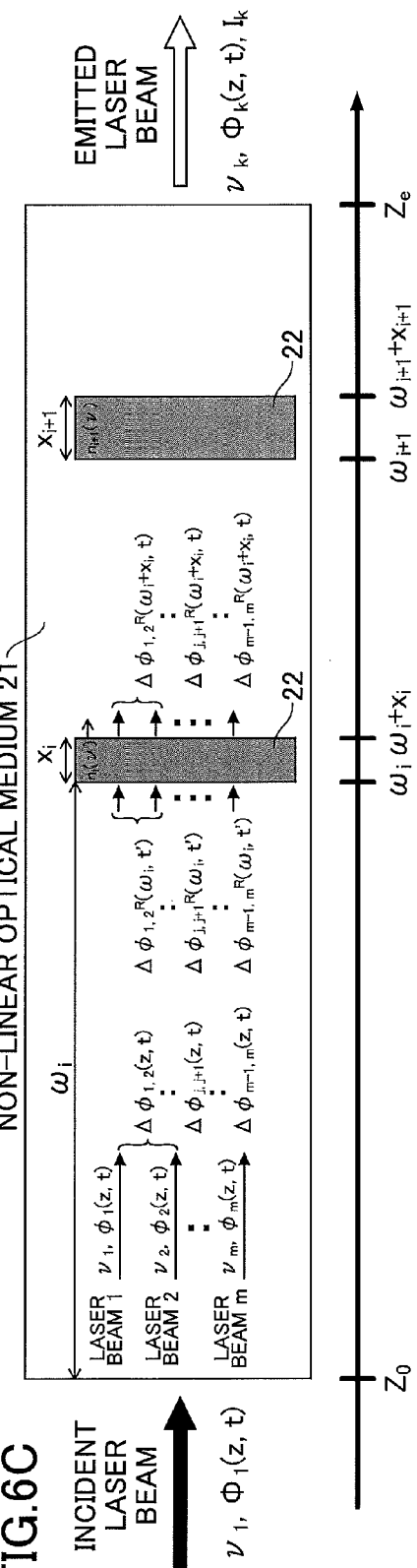

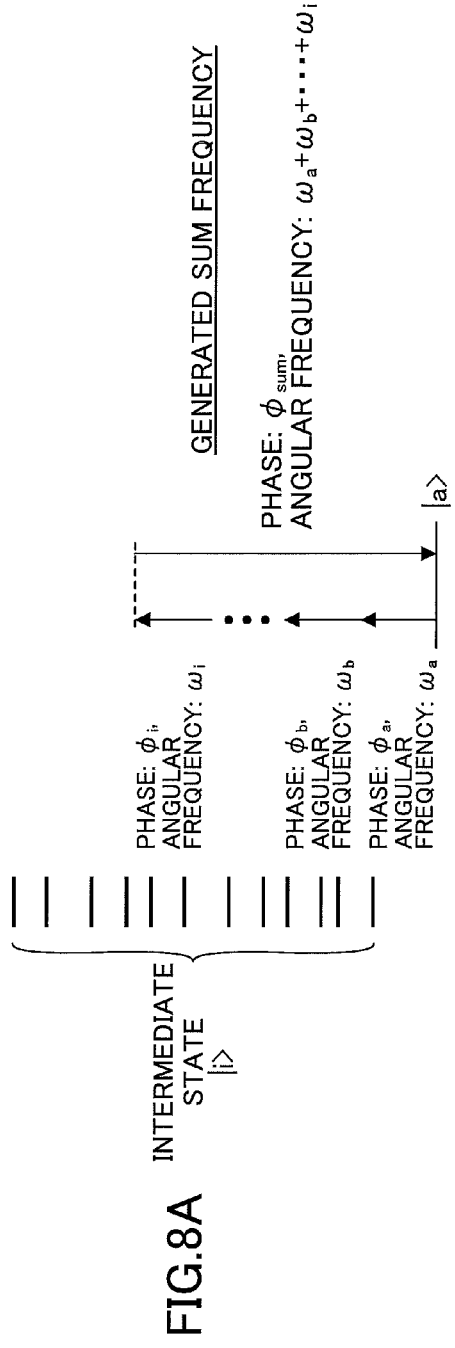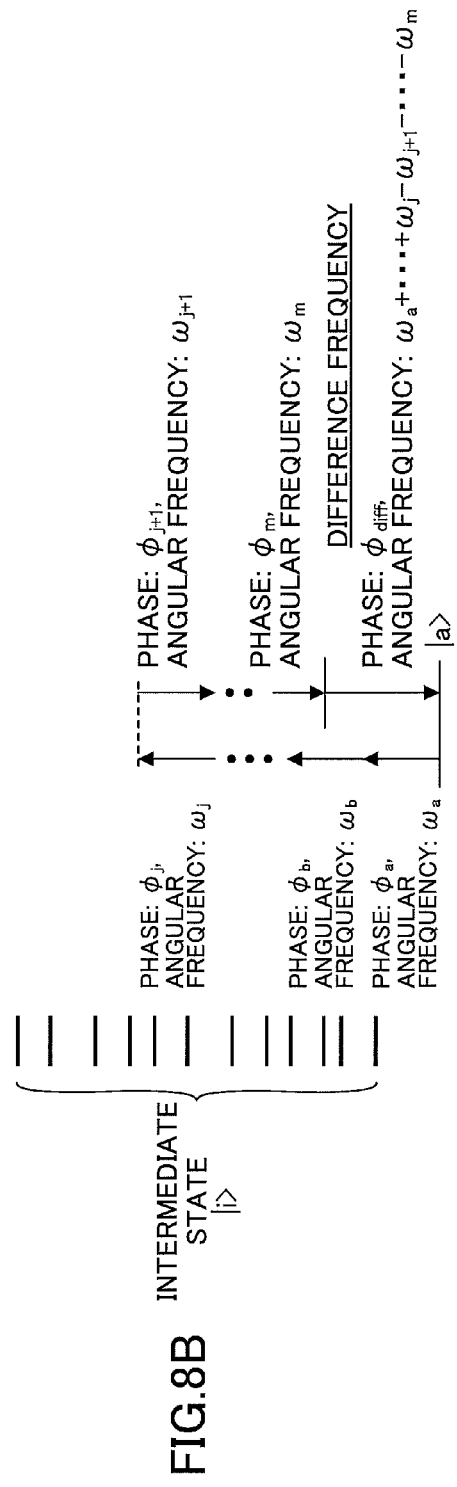

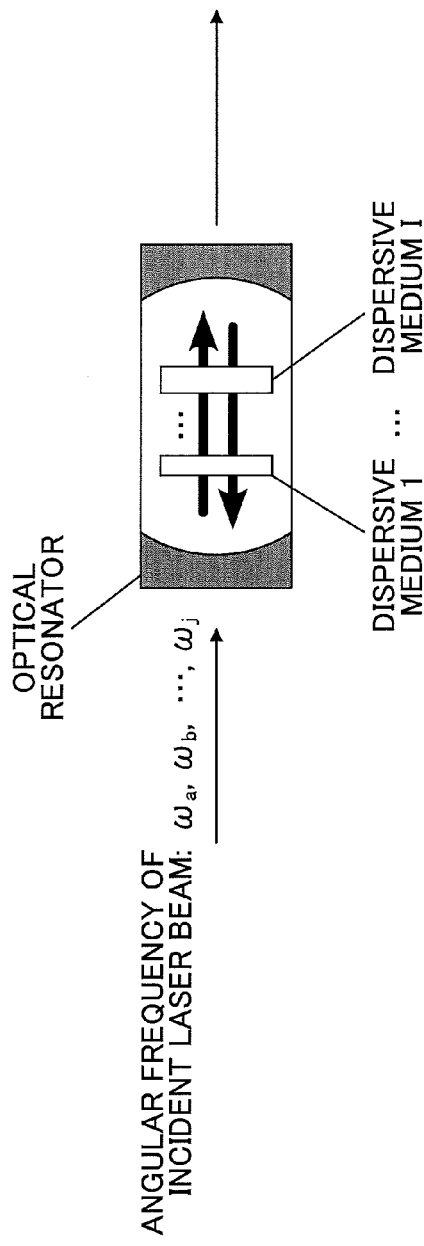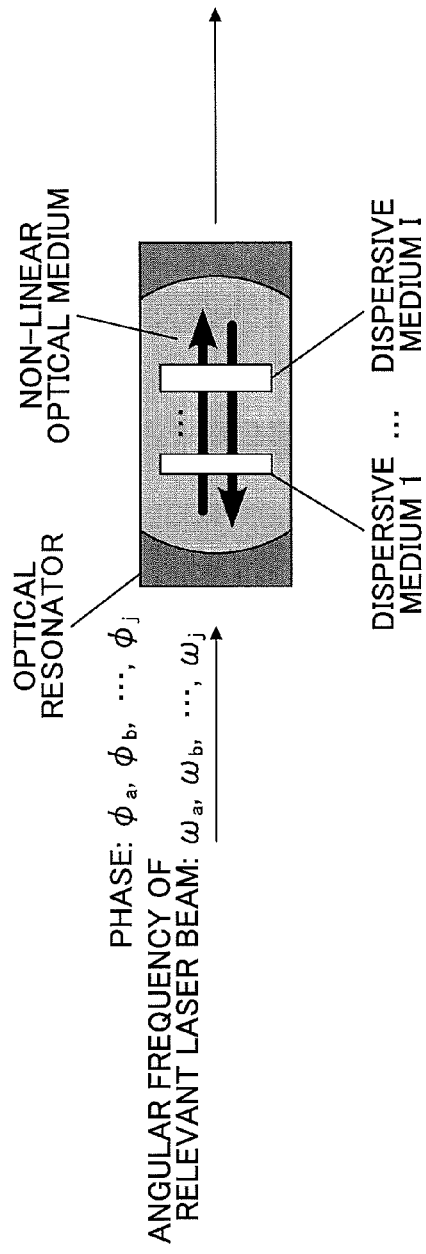

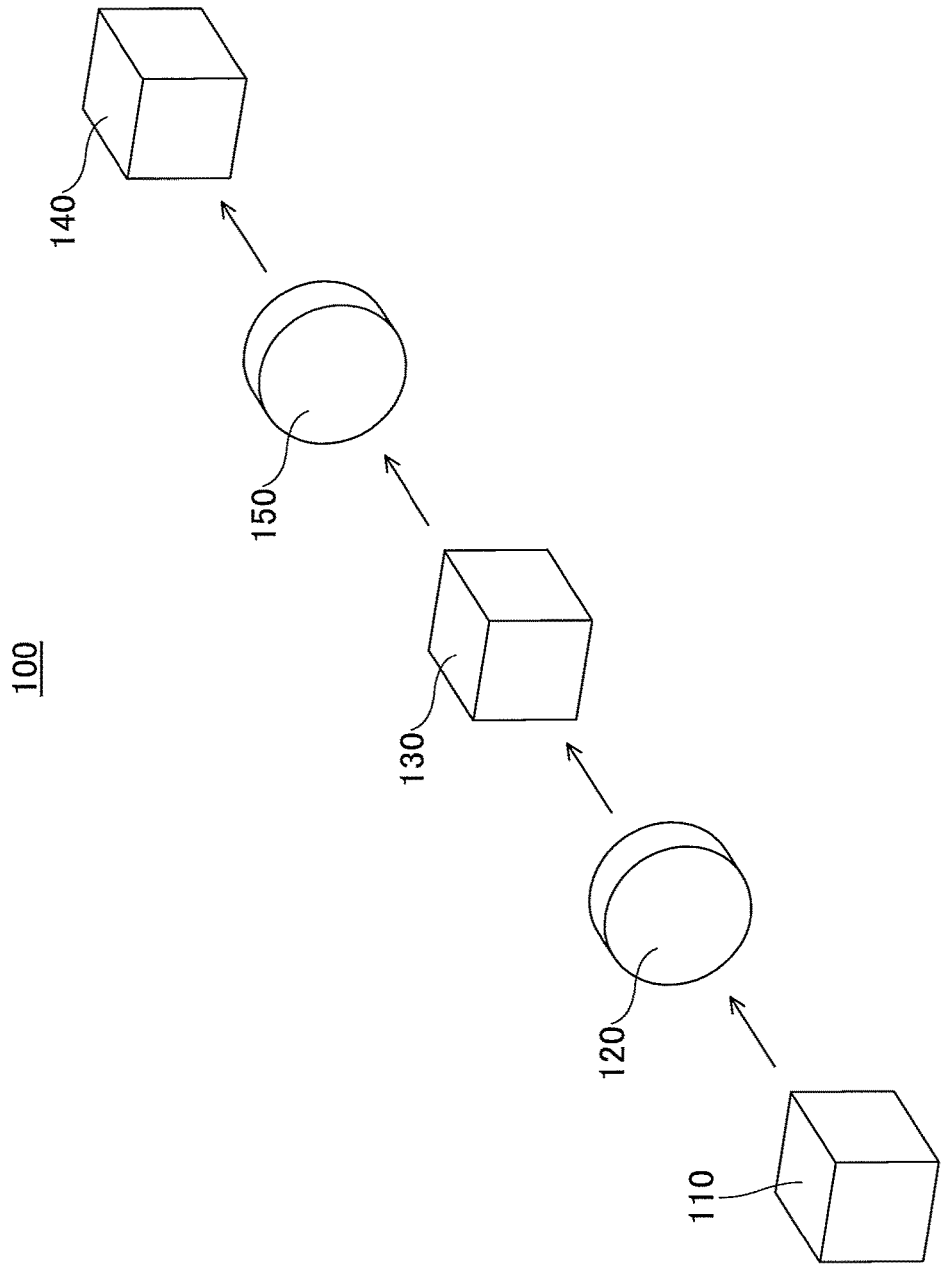

$T_\parallel \propto |E_{2x}|^2 = 1 - \sin^2 2\theta \sin^2(\phi/2)$ $T_\parallel \propto |E_{2x}|^2 = 1 - \sin^2 2\theta \sin^2(\phi/2)$

| | Wavelength (nm) | Frequency (THz) | Amplitude (a. u.) |
|---|---|---|---|
| $\Omega_{-2}$ | 2417.681 | 124 | 1 |
| $\Omega_{-1}$ | 1208.840 | 248 | 1 |
| $\Omega_0$ | 805.8937 | 372 | 1 |
| $\Omega_1$ | 604.4203 | 496 | 1 |
| $\Omega_2$ | 483.5362 | 620 | 1 |

# LASER DEVICE

CROSS-REFERENCE TO RELATED APPLICATION

This application is a U.S. continuation application filed under 35 USC 111(a) claiming benefit under 35 USC 120 and 365(c) of PCT application PCT/JP2015/063842, filed on May 7, 2015, which claims priority to Application Ser. Nos. 2014-096297 and 2014-096303, filed in Japan on May 7, 2014. The foregoing applications are hereby incorporated herein by reference.

TECHNICAL FIELD

The present invention generally relates to, for example, a laser device and a method for manipulating nonlinear or linear optical processes for efficiently implementing a desired optical process. For example, the present invention relates to techniques that allow intensity distribution, polarization distribution, and spectral phase of discrete spectral components of a laser beam to be arbitrarily changed. The present invention further relates to a laser beam designing method and a laser device that can generate laser beams having various optical waveforms.

BACKGROUND ART

Along with the improvement of laser beam performance (particularly, improvements in the technology for increasing the output of laser beams and the technology for shortening the wavelengths of laser beams), laser processing technology using lasers (e.g., using a laser as a light source for lithography in LSI manufacturing) has grown to be one of industries' core technologies. In addition to increasing the output of laser beams and improving the efficiency of laser beams, shortening of the wavelengths of laser beams is desired for implementing finer and more precise processing.

In recent years, nonlinear optical technology using high intensity attosecond light sources is developing (see, for example, Non-Patent Documents 1 and 2). Such optical technology is targeted for a soft X-ray wavelength range.

RELATED ART DOCUMENT

Non-Patent Document

Non-Patent Document 1: Nature Physics 3, 381, 2007, P. B. Corkum, F. Krausz
Non-Patent Document 2: Nature Photonics 5, 655 2011, G. Sansone et al.

In a case where the above-described laser such as an excimer laser is directly oscillated from a laser source for the purpose of, for example, semiconductor lithography or short-wavelength processing, a laser beam having high intensity and short wavelength can be obtained. However, the laser beam has a problem of poor spatial beam quality (e.g., beam being focused too tightly, low $M^2$ factor).

In order to resolve the problem of beam quality, there is a technology of converting the wavelength of a laser beam from a long wavelength to a short wavelength by applying a wavelength-conversion crystal (e.g., nonlinear crystal) to a long-wavelength laser beam such as a fixed laser. However, in a case of converting the wavelength of a high output laser from a long wavelength to a short wavelength, there is a problem in which the wavelength-conversion crystal deteriorates in a short period and becomes damaged due to thermal stress or the like. Thus, from the standpoint of facility maintenance, it is realistically difficult to apply the wavelength conversion technology to a light source used for purposes such as semiconductor lithography and short-wavelength processing.

SUMMARY OF THE INVENTION

In order to solve the above-described problems, an embodiment of the present invention provides a laser device includes a light source that radiates a laser beam having one or more frequencies, and a nonlinear optical medium on which the laser beam is incident, the non-linear optical medium including at least one dispersive medium that is transparent and arranged along a direction in which the laser beam is radiated. The nonlinear optical medium drives a nonlinear optical process including generation of laser beams having different frequencies. The at least one dispersive medium has an effective thickness that causes a relative phase relationship among all the laser beams relevant to the nonlinear optical process to approximately satisfy a predetermined value.

BRIEF DESCRIPTION OF DRAWINGS

FIG. 2A is a schematic diagram illustrating a case of applying an embodiment of the present invention to a stimulated Raman scattering process;

FIG. 2B is a schematic diagram illustrating a case of applying an embodiment of the present invention to a stimulated Raman scattering process;

FIG. 5 is a schematic perspective view illustrating a configuration of a laser device according to an embodiment of the present invention;

FIGS. 6A through 6C are schematic diagrams for describing a phase relationship in a case of inserting a dispersive medium to manipulate all laser beams relevant to an optical process according to an embodiment of the present invention;

FIGS. 8A and 8B are schematic diagrams illustrating a process of generating a sum frequency wave and a difference frequency wave according to an embodiment of the present invention;

FIG. 9A is a schematic diagram illustrating a configuration for capturing one or more light beams inside a resonator according to an embodiment of the present invention;

FIG. 9B is a schematic diagram illustrating a configuration for implementing an optical process by phase manipulation according to an embodiment of the present invention;

FIG. 12 is a perspective view illustrating a part of a laser device according to an embodiment of the present invention;

DESCRIPTION OF EMBODIMENTS

Figure 1A:
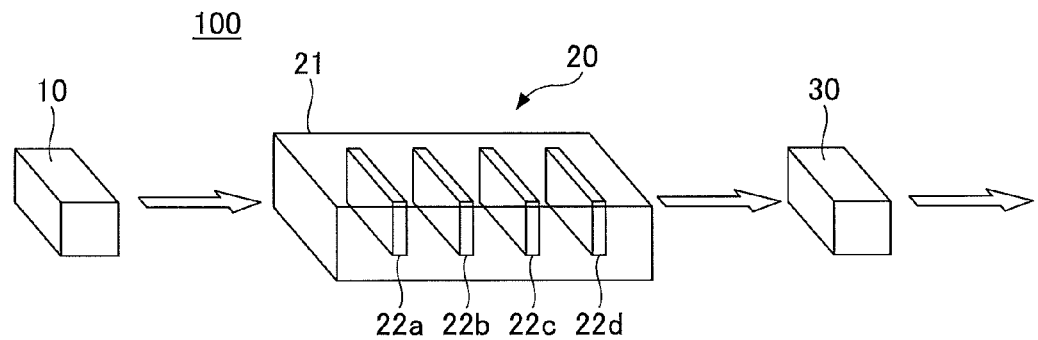
FIG. 1A is a perspective view illustrating a portion of a configuration of a laser device according to an embodiment of the present invention.

The invention will be described with reference to the accompanying drawings. Throughout the drawings, like components and corresponding configurations are denoted with like reference numerals and further explanation thereof is omitted.

[Method of Manipulating Nonlinear Optical Process]

First, a method of manipulating a nonlinear optical process according to an embodiment of the present invention is described.

As illustrated in FIG. 1A, the manipulation method of this embodiment pertains to a nonlinear optical process that causes a laser beam (arrow in FIGS. 1A-1B) radiated from a light source 10 to be incident on a medium 20.

When light such as a laser beam having low intensity is incident on a substance, linear polarization is generated inside the substance, and the frequency of the light transmitted through the substance does not change. However, as the intensity of the light increases, the polarization generated inside the substance deviates from linear polarization and nonlinear behavior begins to significantly appear. In this case, the light transmitted through the substance typically contains a component having a frequency different from the frequency of the incident laser beam.

Therefore, whether the substance is a linear optical medium or a nonlinear optical medium is defined by the relationship between the incident laser beam and the substance. Thus, in the present application, the term "linear optical medium" refers to a medium in which the polarization generated (driven) inside the medium by an incident laser beam exhibits a linear behavior.

The interaction between the substance and the incident light causes the polarization generated (driven) inside the medium to vibrate at high frequency and causes an electromagnetic wave to be emitted from the medium. In a case where linear polarization is generated (driven) by an incident laser beam, the frequency of the electromagnetic wave emitted from the medium is the same as the frequency of the incident laser beam. However, in a case where nonlinear polarization is generated (driven) by the incident laser beam, the electromagnetic wave emitted from the medium typically includes a component having a frequency different from the frequency of the incident laser beam. In the present application, this electromagnetic wave is referred to as "generated laser beam".

As described above, in a case where the intensity of an incident laser beam is high, a frequency component of a generated laser beam not only includes a component having a frequency that matches the frequency of the incident electromagnetic wave (incident laser beam) but also includes a component having a frequency that is twice the frequency of the incident electromagnetic wave. In a case where there are two incident electromagnetic waves, the frequency component of the generated laser beam may include, for example, a component having a frequency equivalent to the total of the frequencies of the two incident electromagnetic waves or a component having a frequency equivalent to the difference between the frequencies of the two incident electromagnetic waves. Therefore, in many nonlinear optical processes, there is some gap between the frequency of a generated laser beam and the frequency of the incident laser beam. Thus, a discrepancy exists between the frequency of a generated laser beam and the frequency of the incident laser beam. Similarly, in a case where multiple laser beams are generated, the frequencies among each of the generated laser beams are also discrete. The incident laser beam and the generated laser beam are transmitted through the medium while exchanging energy between their different frequency components by way of nonlinear interaction (nonlinear polarization) occurring inside the medium. In the present application, the term "nonlinear optical medium" refers to a medium in which nonlinear polarization is generated inside the medium by an incident laser beam.

The kind of frequency component and the amount of the frequency component that can be obtained from the generated laser beams depend on conditions such as the intensity of the incident laser beam, the intensity of the nonlinear optical response based on the property of the medium, the relative phase relationships/phase matching conditions among the incident laser beams and the generated laser beams that have frequencies different from each other. For example, an incident laser beam having frequency $\omega$ can be converted to have a frequency of $2\omega$ at a probability of substantially 100% under appropriate conditions. Doubling the frequency of the incident laser beam two times means that the wavelength of the incident laser beam is reduced to a ½ wavelength. For example, a titanium (Ti) sapphire laser beam having a wavelength of 800 nm can be efficiently converted into a violet light having a wavelength of 400 nm by using a nonlinear optical crystal such as BBO (Beta Barium Borate).

Next, each of the elements used in the method for manipulating a nonlinear optical process according to an embodiment of the present invention is described.

<Laser>

As illustrated in FIG. 1A, the incident laser beam used in the nonlinear optical process according to an embodiment of the present invention is radiated from the light source 10. After the laser beam from the light source 10 is incident on the medium 20, the laser beam is emitted to the outside of the medium 20. The type of laser that is used is not limited in particular. For example, a semiconductor laser using a group III-IV semiconductor, a fixed laser such as a YAG laser, a liquid laser, or a gas laser such as an excimer laser or a $CO_2$ gas laser may be used.

Note that the incident laser beam may be a laser having a single frequency or a laser having multiple different frequencies. In a case where the incident laser beam has multiple frequencies, each frequency is preferred to be formed of a discrete spectrum. Further, the space between discrete spectra, that is, the spacing between the multiple frequencies is preferably greater than or equal to 10 THz. Note that the term "discrete spectrum" refers to a state in which multiple peak wavelengths discretely exist in a laser beam.

Further, the wavelength of the laser beam is preferred to have a wavelength longer than 200 nm, so that the laser beam can attain a satisfactory beam quality. Further, the type of laser is preferably a fixed laser from the standpoint of steadily oscillating the laser beam of the above-described wavelength range.

<Medium>

The medium 20 used in the nonlinear optical process according to an embodiment of the present invention includes a transparent dispersive medium. More specifically, the medium 20 includes an optical medium 21 formed of a nonlinear optical medium as illustrated in FIG. 1A. The optical medium 21 has one or more transparent dispersion media 22 inserted therein. In the example illustrated in FIG. 1A, four rectangular parallelepiped dispersion media 22a to 22d are inserted into the optical medium 21. As described below, the relative phases between the different frequencies of the multiple laser beams related to this optical process can be changed by providing the optical medium 21 and the multiple dispersion media 22 in the medium 20. Further, the relative phases can be manipulated to an optimum value with respect to a desired optical process by adjusting the positions of the dispersion media 22 and the effective thicknesses of the dispersion media 22. Accordingly, a desired optical process can be efficiently implemented.

Note that the optical medium 21 is preferably a liquid or a gas whereas the dispersive medium 22 is preferably a solid. The optical medium 21 is preferred to be a liquid or a gas because the dispersive medium 22 can be easily inserted into a given position. Further, the dispersive medium 22 is preferred to be a solid for facilitating the adjustment of the effective thickness of the dispersive medium 22 by changing the tilt of the dispersive medium 22 and changing the insertion thickness of one of a pair of dispersion media 22 forming a wedge-like shape.

For example, the optical medium 21 may be filled into an airtight box including an incident light opening and an emitting light opening. The airtight box may be formed of a copper plate and have glass windows provided in the incident light opening and the emitting light opening, respectively. The optical medium 21 formed of a nonlinear optical medium may be, for example, hydrogen gas, nitrogen gas, or noble gas. Whether the optical medium 21 is a nonlinear optical medium or a linear optical medium is defined by the relative relationship with respect to the incident laser beam.

The dispersive medium 22 may be, for example, silicate, glass, calcium fluoride, or magnesium fluoride. Although the dispersive medium 22 is to be transparent, the term "transparent" refers to a property of transmitting a laser beam. Thus, the dispersive medium 22 may include a medium having color or a clouded medium and is not required to have complete transparency (a property causing no interaction between the dispersive medium and the incident laser beam and causing absolutely no absorbing or scattering of electromagnetic waves). Further, the term "dispersive medium" in the present application refers to a medium having a refractive index that is dependent on the frequency or the wavelength of the laser beam.

<Manipulation of Nonlinear Interacting Property Between Laser Beam and Medium>

One of the features of the method for manipulating a nonlinear optical process according to an embodiment of the present invention is to manipulate the nonlinear optical property of the interaction between a laser beam and an optical medium by adjusting the effective thickness of a dispersive medium and the position of the dispersive medium in the propagating direction of the laser beam.

By adjusting the effective thickness of the dispersive medium and the position of the dispersive medium in the propagating direction of the laser beam, the relative phase of multiple laser beams relevant to the optical process can be controlled. As a result, the nonlinear optical property of the interaction between the incident laser beam and the optical medium can be manipulated by simply preparing a specific dispersive medium without having to use any sophisticated device or the like. Further, according to an embodiment of the present invention, the lifespan of a laser device can be increased because efficient wavelength conversion can be achieved without using a wavelength conversion crystal that is susceptible to thermal stress or the like.

Figure 1B:
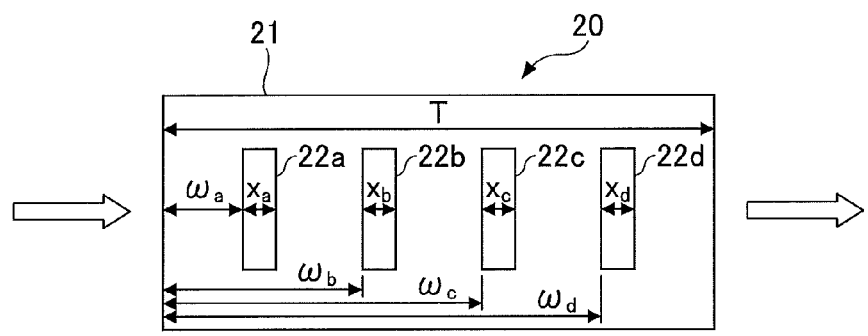
FIG. 1B is a cross-sectional view illustrating a medium inside a laser device according to an embodiment of the present invention.

Note that the phrase "position of the position of the dispersive medium in the propagating direction of the laser beam" refers to the distance between a point where the laser beam is incident on the optical medium and a point where the laser beam reaches the dispersive medium. For example, each of the distances $\omega_a$, $\omega_b$, $\omega_c$, $\omega_d$ may be assumed to be each of the positions of the dispersion media 22a, 22b, 22c, and 22d as illustrated in FIG. 1B. Further, as illustrated in FIG. 1B, the thickness of each of the rectangular parallelepiped dispersion media 22a to 22d corresponds to $x_a$ to $x_d$, respectively. In the example illustrated in FIG. 1B, the effective thickness of each of the dispersion media in the propagating direction of the laser beam corresponds to the thickness $x_a$, $x_b$, $x_c$, $x_d$ of each of the dispersion media 22a to 22d in the propagating direction of the laser beam.

Figure 1C:
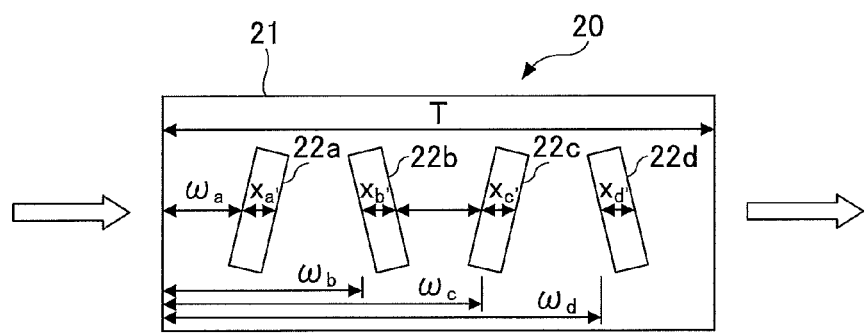
FIG. 1C is a cross-sectional view illustrating a medium inside a laser device according to an embodiment of the present invention.

In the present application, the effective thickness of the dispersive medium does not refer to the plate thickness of the dispersive medium but refers to the distance in which a straightly propagating laser beam transmits inside the dispersive medium. For example, in a case where the planar surface of each of the dispersion media 22a to 22d is not oriented orthogonal to the optical path of the laser beam as illustrated in FIG. 1C, the effective thickness of each of the dispersion media 22a to 22d is correspond to the path length $x_a'$ to $x_d'$ of the laser beam that is transmitted inside each of the dispersion media 22a to 22d.

The following describes the reason that an optical property can be manipulated by adjusting the effective thickness of the dispersive medium and the position of the dispersive medium in the propagating direction of the laser beam.

For example, in a stimulated Raman scattering process illustrated in FIGS. 2A and 2B, the relative phase relationship of laser beams relevant to this optical process defines the flow (or interaction) of energy among the relevant laser beams. For example, in a stimulated Raman scattering process of one of the three kinds of frequencies $W_p$, $W_{p+1}$, $W_m$' of laser beams relevant to the optical process of FIG. 2B, the relative relationship of phases $\varphi_p$, $\varphi_{p+1}$, $\varphi_m$ of each of the three frequencies defines the flow of energy between the laser beams of the two kinds of frequencies $W_p$, $W_{p+1}$.

Meanwhile, the relative relationship of phases can be changed by inserting the dispersive medium. Further, the relative relationship of phases can be controlled to be a desired relative relationship of phases by adjusting the effective thickness of the dispersive medium. Further, the relative relationship of phases can be controlled at a given position by selecting the position in which the dispersive medium is inserted. Accordingly, a specific stimulated Raman scattering process enabling energy to concentrate to a laser beam of a desired frequency can be implemented by adjusting the position and effective thickness of each dispersive medium and controlling the relative phase relationship among respective laser beams.

Figure 3:
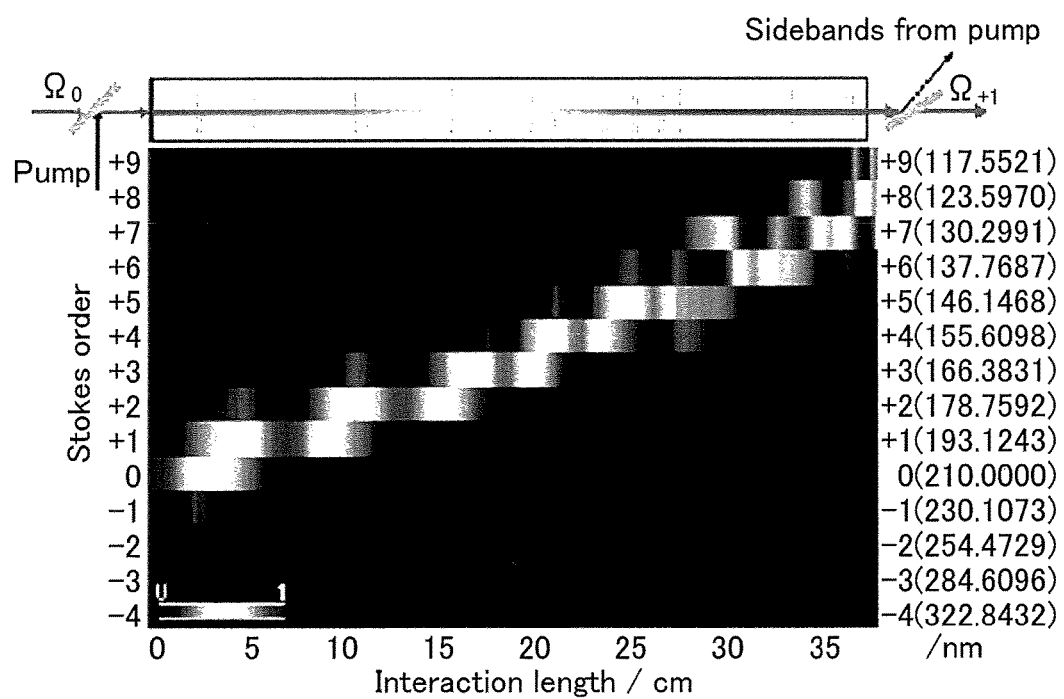
FIG. 3 is a graph illustrating a relationship between the positions of a nonlinear optical medium and the distribution of strength (quantum efficiency) with respect to each wavelength of a laser beam in a case of using a dispersive medium according to an embodiment of the present invention while adjusting the positions of the nonlinear optical medium along a propagation direction of the laser beam and the optical thickness of the nonlinear optical medium.

FIG. 3 depicts an example of using a medium in which a dispersive medium formed of magnesium fluoride is inserted into a nonlinear optical medium formed of para-hydrogen (p-$H_2$). FIG. 3 illustrates a relationship between the intensity distribution (Quantum Efficiency (QE)) of each wavelength of the multiple laser beams relevant to the optical process including generated laser beams and the position (distance, cm) relative to the incident plane of the optical medium when the effective thickness of the dispersive medium and the position of the dispersive medium in the propagating direction of the laser beam are adjusted. By changing the conditions (position and effective thickness) of the dispersive medium, it can be understood that a laser beam having energy concentrating in various wavelengths can be obtained step-by-step in correspondence with the position relative to the incident plane of the optical medium. Accordingly, it can be understood that a laser beam having energy concentrating in a desired wavelength can be ultimately obtained by changing the conditions of the dispersive medium and the length (T) of the optical medium (T). Note that, in the example illustrated in FIG. 3, a pump beam light is also incident on the nonlinear optical medium in addition to the incident laser beam, so that a massive nonlinear polarization is excited in the nonlinear optical medium.

Figure 4:
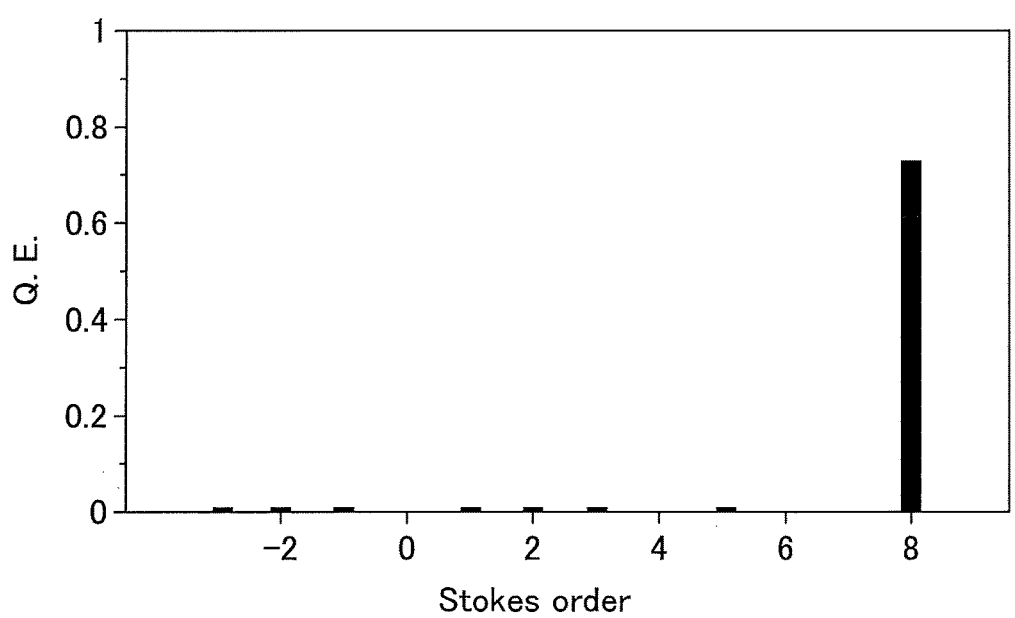
FIG. 4 a diagram illustrating an intensity distribution (quantum efficiency) of each wavelength of a laser beam in a nonlinear optical medium according to an embodiment of the present invention.

FIG. 4 illustrates the intensity distribution (quantum efficiency (QE)) of each wavelength of all of the laser beams relevant to the optical process including generated laser beams when the effective thickness of the dispersive medium and the position of the dispersive medium in the propagating direction of the laser beam are adjusted. It can be understood that a laser beam of a specific wavelength (in the example of FIG. 4, 123.5978 nm: +8$^{th}$ order according to Stokes order) can be obtained by adjusting the conditions of the dispersive medium and the length of the nonlinear optical medium (37.385 am in the example of FIG. 4).

Next, an embodiment of the present invention described in further detail by referring to FIGS. 6A-6C. In FIGS. 6A-6C, "$\varphi_j(z, t)$" refers to the phase of the one of the laser beams having a frequency $v_j$ at the position z and the time t. In the example illustrated in FIG. 6A, the laser beam incident on the nonlinear optical medium 21 is an incident laser beam having a frequency $v_1$ and a phase $\varphi_1$ (z, t). When the incident laser beam is incident on the nonlinear optical medium 21, nonlinear polarization occurs (driven), and the nonlinear polarization generates multiple laser beams (generated laser beams). In the example of FIG. 6A, the multiple generated laser beams include laser beam 1 having a frequency $v_1$ and phase $\varphi_1$ (z, t), a laser beam 2 having a frequency $v_2$ and a phase $\varphi_2$ (z, t), . . . a laser beam j having a frequency $v_j$ and a phase $\varphi_j$ (z, t), a laser beam j+1 having a frequency $v_{j+1}$ and a phase $\varphi_{j+1}$ (z, t), . . . , and a laser beam m having a frequency $v_m$ and a phase $\varphi_m$ (z, t).

Then, the relative phase between laser beams of adjacent frequencies is calculated. In the example of FIG. 6B, "$\Delta\varphi_{j, j+1}$ (z, t)" indicates a relative phase between adjacent laser beams relevant to the optical process illustrated in FIG. 6A, more specifically, a relative phase between the laser beam j having a frequency $v_j$ and the laser beam j+1 having a frequency $v_{j+1}$ at the position z and the time t. Thus, the relative phases in the example of FIG. 6A are "$\Delta\varphi_{j, j+1}$ (z, t)"=$\varphi_{j+1}$ (z, t)−$\varphi_{j+1}$ (z, t)", "$\Delta\varphi_{1, 2}$ ($\omega_i$, t')", "$\Delta\varphi_{2, 3}$ ($\omega_i$, t')", . . . "$\Delta\varphi\varphi_{j, j+1}$ ($\omega_i$, t')" . . . "$\Delta\varphi_{m-1, m}$ ($\omega_i$, t')".

Further, the nonlinear optical medium 21 according to this embodiment of the present invention is aimed to emit a laser beam having a frequency $v_k$, and a phase $\varphi_k$ (z, t). Further, "$I_k$" indicates the intensity of the emitted laser beam. Note that the emitted laser beam may be a laser beam having multiple frequency components. When the multiple generated laser beams propagate inside the nonlinear optical medium 21, the relative phases between adjacent laser beams define the intensity distribution and the phase relationship of the laser beams of each frequency caused by the nonlinear polarization. In general, an emitted laser beam includes multiple frequency components, and a desired emitted laser beam that is obtained has various intensity distribution (and relative phase distribution) among the frequency components of the emitted laser beam. Further, it is the refractive index dispersion of the dispersive medium 22 that defines whether the relative phases among respective laser beams are changed by dispersion when the multiple laser beams propagate in the dispersive medium 22. Therefore, an ideal value for the relative phases among respective laser beams can inevitably be defined by setting the target emitted laser beam to have a frequency $v_k$ and a phase $\varphi_k$ (z, t) in a case where the position of the emission surface of the $i^{th}$ ("i" being a natural number greater than or equal to 1) of the dispersive medium 22 is (z=$\omega_i$+$x_i$). Thus, the defined ideal values of the relative phases can be indicated as "$\Delta\varphi_{1, 2}^R(\omega_i+x_i, t)$", "$\Delta\varphi_{2, 3}^R(\omega_i+x_i, t)$", . . . , "$\Delta\varphi_{j, j+1}^R(\omega_i+x_i, t)$", "$\Delta\varphi_{m-1, m}^R(\omega_i+x_i, t)$".

Further, by focusing on the relationship between the relative phase "$\Delta\varphi_{1, 2}$ ($\omega_i$, t')" and the relative phase "$\Delta\varphi_{1, 2}^R(\omega_i+x_i, t)$", it can be understood that the relative phase "$\Delta\varphi_{1, 2}^R(\omega_i+x_i, t)$" is the phase difference when each of the laser beam having the frequency $v_1$ and the laser beam having the frequency $v_2$ propagates $x_i$ from $\Delta\varphi_{1, 2}$ ($\omega_i$, t') inside the dispersive medium 22. That is, the following expression (1) is satisfied.

mod [$\Delta\varphi_{1,2}(\omega_i, t') + 2\pi[v_2 n_i(v_2) - v_1 n_i(v_1)]x_i/c, 2\pi$]=
$\Delta\varphi_{1,2}^R(\omega_i+x_i, t)$            Expression (1)

Note that "mod" indicates a congruent expression. For example, "mod [$f$ (x), $2\pi$]=a" indicates that the remainder is "a" when a function $f$ (x) is divided by "$2\pi$". Further, "$n_i(v_j)$" indicates the speed of light in vacuum. For the sake of convenience, only the $i^{th}$ dispersive medium 22 and the $i+1^{th}$ dispersive medium 22 are illustrated and the other dispersion media 22 are omitted in the example of FIG. 6C. Note that the number of dispersion media 22 provided in the optical medium 21 may be one.

The phase that advances when the laser beam 2 transmits through the dispersive medium $n_i$ is "$2\pi v_2 \, n_i(v_2) \, x_i/c$". On the other hand, the phase that advances when the laser beam 1 transmits through the dispersive medium $n_i$ is "$2\pi v_1 \, n_i (v_1) \, x_i/c$". Therefore, the relative phase that advances when the laser beam 2 and the laser beam 1 transmit through the dispersive medium $n_i$ is "$2\pi[v_2 \, n_i \, (v_2) - v_1 n_i(v_1)]x_i/c$".

Because the relative phase between the laser beams 1 and 2 is "$\Delta\varphi_{1,\,2} \, (\omega_i, t')$" in a case where the time is "t'" at the position "$(z=\omega_i)$" of the incident surface of the dispersive medium 22, the relative phase at the position "$(z=\omega_i+x_i)$" of the emission surface of the dispersive medium 22 can be expressed to be "$\Delta\varphi_{1,\,2} \, (\omega_i, t') + 2\pi[v_2 n_i \, (v_2) - v_1 n_i \, (v_1)]x_i/c$".

Because the relative phase is a periodic function having "$2\pi$" as its period, the following expression is obtained in a case where "$\Delta\varphi_{1,\,2}^{R}(\omega_i+x_i, t)$" is assumed to be equivalent to an ideal value.

mod [$\Delta\varphi_{1,2}(\omega_i,t')+2\pi[v_2 n_i \, (v_2)-v_1 n_i(v_1)]x_i/c, 2\pi$]=
 $\Delta\varphi_{1,2}^{R}(\omega_i+x_i,t)$      Expression (1)

Note that the time "t'" indicates the time when a laser beam reaches the position "$(z=\omega_i)$" of the incident surface of the dispersive medium 22. Further, the time "t" of the relative phase "$\Delta\varphi_{1,\,2}^{R}(\omega_i+x_i, t)$" indicates the time at the position $(z=\omega_i+x_i)$ of the emission surface of the dispersive medium 22. That is, "t" indicates the time required for the laser beam to propagate a distance of $x_i$ inside the dispersive medium 22.

Similarly, the following expressions can be derived for the other laser beams.

mod [$\Delta\varphi_{2,3}(\omega_i,t')+2\pi[v_3 n_i \, (v_3)-v_2 n_i(v_2)]x_i/c, 2\pi$]=
 $\Delta\varphi_{2,3}^{R}(\omega_i+x_i,t)$      Expression (2)

. . .

mod [$\Delta\varphi_{j,j+1}(\omega_i,t')+2\pi[v_{j+1} n_i \, (v_{j+1})-v_j n_i(v_j)]x_i/c, 2\pi$]=
 $\Delta\varphi_{j,j+1}^{R}(\omega_i+x_i,t)$      Expression (j)

. . .

mod [$\Delta\varphi_{m-1,m} \, (\omega_i,t')+2\pi[v_m n_i \, (v_m)-v_{m-1} n_i(v_{m-1})]x_i/c,$
 $2\pi$]=$\Delta\varphi_{m-1,m}^{R}(\omega_i+x_i,t)$      Expression (m-1)

Note that, because the relative phase "$\Delta\varphi_{j,\,j+1}$ (z, t)" is a periodic function having "$2\pi$" as its period, the relative phase "$\Delta\varphi_{j,\,j+1}$ (z, t)" is expressed as "$0 \leq \Delta\varphi_{j,\,j+1}$ (z, t)$<2\pi$".

The effective thickness "$x_i$" of the dispersive medium 22 may be used as an approximate solution that most satisfies all of the above-described expressions (1) to (m-1). Therefore, considering the nonlinear optical phenomenon that desired to occur (desired result), the position $\omega_i$ of the phase to be manipulated and the kind of manipulation to be performed on the phase are determined first. Then, the effective thickness $x_i$ of the dispersive medium is obtained by using the expressions (1) to (m) in a case where the determined position is "$\omega_i$". Accordingly, the position "$\omega_i$" can be determined by calculating the desired result (desired nonlinear optical phenomenon) backward and repeating the numerical simulation pertaining to the nonlinear optical phenomenon.

In the example illustrated in FIGS. 6A to 6C, expressions (1) to (m) are formularized for all of the laser beams (generated laser beams 1 to m) that are generated with respect to the incident laser beam having the frequency $v_1$ and the phase $\varphi_1$ (z, t). Alternatively, "$x_i$" may be obtained as an approximate solution by formularizing expressions for a portion of the generated laser beams (e.g., formularizing expressions (1) to (j)). Alternatively, "$x_i$" may be obtained as an approximate solution by weighting only a portion of the expressions (1) to (m-1).

The same also applies to the $i+1^{th}$ dispersive medium in which the following expressions can be derived.

mod [$\Delta\varphi_{1,2}(\omega_i,t')+2\pi[v_2 n_i \, (v_2)-v_1 n_i(v_1)]x_i/c, 2\pi$]=
 $\Delta\varphi_{1,2}^{R}(\omega_i+x_i,t)$      Expression (1)

mod [$\Delta\varphi_{2,3}(\omega_i,t')+2\pi[v_3 n_i \, (v_3)-v_2 n_i(v_2)]x_i/c, 2\pi$]=
 $\Delta\varphi_{2,3}^{R}(\omega_i+x_i,t)$      Expression (2)

. . .

mod [$\Delta\varphi_{j,j+1}(\omega_i,t')+2\pi[v_{j+1} n_i \, (v_{j+1})-v_j n_i(v_j)]x_i/c, 2\pi$]=
 $\Delta\varphi_{j,j+1}^{R}(\omega_i+x_i,t)$      Expression (j)

. . .

mod [$\Delta\varphi_{m-1,m} \, (\omega_i,t')+2\pi[v_m n_i \, (v_m)-v_{m-1} n_i(v_{m-1})]x_i/c,$
 $2\pi$]=$\Delta\varphi_{m-1,m}^{R}(\omega_i+x_i,t)$      Expression (m-1)

The effective thickness $x_{i+1}$ of the $i+1^{th}$ dispersive medium at the position $\omega_{i+1}$ is obtained by using the expressions (1) to (m-1).

In a case where n dispersion media 22 are arranged inside the nonlinear optical medium 21, n sets of expressions (1) to (m-1) are formularized. Then, optimum thicknesses $x_1$ to $x_n$ are obtained by using expressions (1) to (m-1). Note that, although the thickness $x_i$ of the dispersive medium 22 nearest to the incident surface of the nonlinear optical medium 21 is obtained before obtaining the thickness $x_{i+1}$ of the dispersive medium 22 being second nearest to the incident surface of the nonlinear optical medium 21 in this embodiment, the thickness $x_{i+1}$ may be obtained before obtaining the thickness $x_i$. That is, there is no particular order for obtaining each of the thicknesses $x_1$ to $x_n$.

In a case where a manipulated relative phase of laser beams significantly deviates from a value that is ideal for efficiently implementing a desired optical process, the effective thickness $x_i$ of a dispersive medium and the position $\omega_i$ of the dispersive medium in the propagating direction of the laser beam do not necessarily need to be defined to satisfy all of the above-described expressions as long as the relative phase of the laser beams can be manipulated again and approximated to the ideal value. However, from the standpoint of reliably performing the manipulation of the phases of the laser beams, the effective thickness $x_i$ of the dispersive medium and the position $\omega_i$ of the dispersive medium in the propagating direction of the laser beam are preferred to be defined, so that the effective thickness $x_i$ of a dispersive medium and the position $\omega_i$ of the dispersive medium in the propagating direction of the laser beam are approximated to satisfy all of the above-described expressions. More preferably, the position of the dispersive medium is to be defined, so that the total number of dispersion media used for efficiently implementing the desired optical process can be reduced.

Although the incident laser beam illustrated in the example of FIGS. 6A and 6C is a single incident laser beam having a frequency of $v_1$ and a phase of $\varphi_1$ (z, t), the number of incident laser beams is not limited to a single laser beam.

That is, multiple laser beams may be incident on the nonlinear optical medium 21.

<Manipulation of Linear Optical Process>

The above-described method of manipulating a nonlinear optical process can also be used for manipulating a linear optical process. In the linear optical process, target values are set to be the frequency $v_k$ and the phase $\varphi_k$ (z, t) of the target emitted laser beam. Then, by setting the frequency and the phase of the target emitted laser beam as $v_k$, $\varphi_k$ (z, t), an ideal value of each laser beam at the position (z=$\omega_i$+$x_i$) of the emission surface of the dispersive medium is inevitably defined. Accordingly, the relative phase of respective laser beams at the emission surface of the dispersive medium can be controlled to be the ideal value by obtaining the effective thickness $x_i$ of the dispersive medium and the position $\omega_i$ of the dispersive medium in the propagating direction of the laser beam.

<Laser Device>

Next, a laser device according to an embodiment of the present invention is described.

As illustrated in FIG. 1A, the laser device according to an embodiment of the present invention includes the light source 10 that radiates a laser beam and the medium 20 on which the radiated laser beam is incident. The medium 20 has multiple transparent dispersion media 22 (four dispersion media 22a to 22d in the example illustrated in FIG. 1A) inserted in the nonlinear optical medium 21. One of the features of the laser device is that the optical property of the interaction between the laser beam and the optical medium 21 can be manipulated by adjusting the effective thicknesses $x_a$ to $x_d$ of the dispersion media 22a to 22d and the positions $\omega_a$ to $\omega_d$ of the dispersion media 22a to 22d in the propagating direction of the laser beam.

Owing to the above-described configuration of the laser device, the optical property of the interaction between a laser beam and a medium can be manipulated without having to use a sophisticated configuration. In addition, the laser device can radiate a laser beam of high output and high beam quality in long and short wavelengths for a long period.

Note that each of the elements (e.g., laser beam, medium, method of manipulating optical property of the laser beam) constituting the laser device of this embodiment are substantially the same as the elements of the above-described method for manipulating the nonlinear optical process.

Further, as illustrated in FIG. 1A, the laser device of this embodiment may also include an amplifying unit 30 that amplifies the laser emitted from the medium 21 in a case where the laser device is used for the purpose of, for example, a laser source for semiconductor lithography, a laser source for short wavelength processing, or a laser source for remote environmental measuring. The amplifying unit 30 may be, for example, an excimer laser or a $CO_2$ gas laser.

A component besides the amplifying unit 30 may also be included in the laser device 100 depending on the purpose of the laser device.

<Method of Designing Laser Beam and Laser Device>

Next, a method of designing a laser beam and a laser device 100 according to an embodiment of the present invention are described with reference to the drawings.

<Method of Designing Laser Beam>

First, a method of designing a laser beam according to an embodiment of the present invention is described.

In the designing method of this embodiment illustrated in FIG. 12, a laser beam (arrow in FIG. 12) radiated from a light source 110 is transmitted through an axial crystal plate 120 and a polarizer 130 in this order. Then, the laser beam is preferably further transmitted through a second axial crystal plate 150. Finally, the laser beam is transmitted through a transparent dispersive medium 140.

Owing to the crystal plate 120 being capable of changing the polarized state of the laser beam and the polarizer 130 being capable of adjusting the amount of the polarized laser beam transmitted therethrough, the amplitude of the discrete spectrum (intensity distribution) of the laser beam can be controlled. Further, the polarization distribution of the discrete spectrum controlled by the crystal plate 120 and the polarizer 130 can be further controlled by allowing the laser beam to be transmitted again through the second axial crystal plate 150. Further, the phase of the discrete spectrum having its intensity distribution and polarization distribution controlled by the crystal plate 120, the polarizer 130, and the second crystal plate 150 can be manipulated by allowing the discrete spectrum to transmit through the transparent dispersive medium 140 and, if necessary, adjusting the thickness of the transparent dispersive medium 140. Thereby, the laser beam including polarized light beams can be manipulated to have a waveform of a desired shape.

Figure 13A:
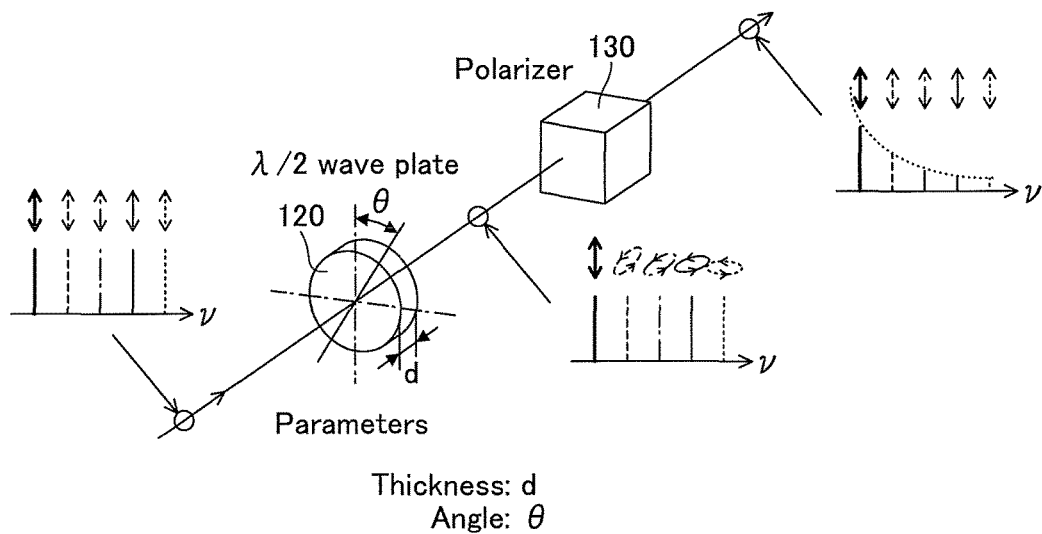
FIG. 13A is a schematic diagram for describing a state of a laser beam when transmitted through an axial crystal plate and a polarizer according to an embodiment of the present invention.

As illustrated in FIG. 13A, the discrete spectrum has its polarized state changed when the discrete spectrum is transmitted through the axial crystal plate 120. Then, the discrete spectrum having its polarized state changed is transmitted through the polarizer 130. Because the change of the polarization state of the discrete spectrum causes some spectra can transmit through the polarizer 130 whereas some spectra cannot transmit through the polarizer 130, the amplitude of the discrete spectrum can be manipulated. Thus, a desired intensity distribution can be obtained.

Figure 13B:
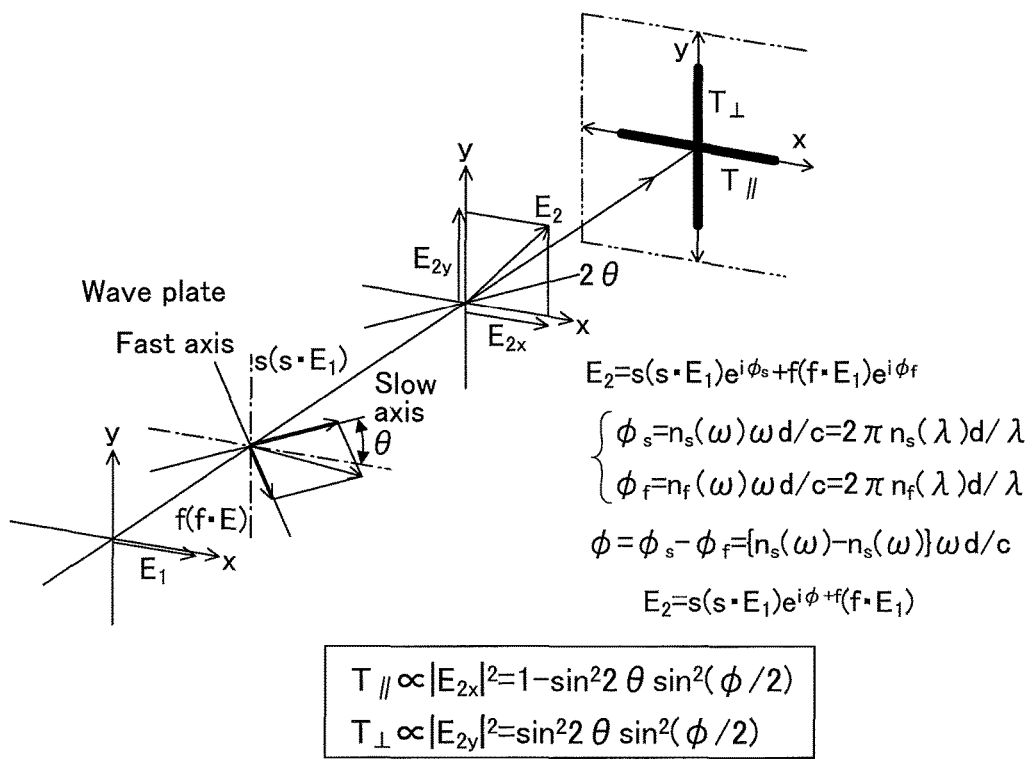
FIG. 13B is an equation expressing the state illustrated in FIG. 13A.

More specifically, owing to a difference in the phase velocity in the fast axis and the slow axis as illustrated in FIG. 13B, a desired polarization distribution can be obtained by manipulating, for example, the weight of the projection components of each axis and/or adjusting the effective thickness d of the axial crystal plate 120.

Then, after a desired intensity distribution is obtained for the discrete spectrum, the polarization distribution of the discrete spectrum can be controlled by allowing the discrete spectrum to be transmitted again through another axial crystal plate 150. Further, the discrete spectrum having its intensity distribution and polarization distribution controlled can further have its phase manipulated by being further transmitted through the transparent dispersive medium 140. In addition, the phase of the discrete spectrum can be further manipulated by adjusting the thickness of the dispersive medium 140 according to necessity. Thereby, the waveform of the laser beam including polarized light can be formed into a desired shape.

By using the method of designing a laser beam according to the above-described embodiment, laser beams of various waveforms can be designed without using a sophisticated configuration.

Next, each component constituting the method of manipulating a nonlinear optical process according to an embodiment of the present invention is described.

<Laser>

As illustrated in FIG. 12, a laser beam used in the nonlinear optical process according to an embodiment of the present invention is radiated from the light source 110. After the laser beam is transmitted through the axial crystal plate 120, the laser beam is emitted to the outside of the laser device 100. The type of laser that is used is not limited in particular. For example, a semiconductor laser using a group III-IV semiconductor, a fixed laser such as a YAG laser, a liquid laser, or a gas laser such as an excimer laser or a $CO_2$ gas laser may be used.

Note that the laser beam includes a discrete spectrum. The laser beam is preferred to include the discrete spectrum because the intensity distribution of the discrete spectrum, the polarization distribution of the discrete spectrum, and the spectral phase of the discrete spectrum can be arbitrarily changed. Thereby, a laser beam having various waveforms can be formed.

Further, the term "discrete spectrum" refers to a state in which multiple peak wavelengths discretely exist in a laser beam.

<Axial Crystal Plate>

The axial crystal plate used in the method for designing a laser beam according to an embodiment of the present invention includes the crystal plate 120 for manipulating the polarization distribution of the spectrum of the laser beam radiated from the light source 110 and the crystal plate for further polarizing the laser beam transmitted through the polarizer 130 as illustrated in FIG. 13A.

The axial crystal plate 120 and the axial crystal plate 150 are optic function elements that provide a predetermined phase difference between polarized elements of a fast axis and polarized elements of a slow axis. The axial crystal plates 120, 150 are not limited in particular as long as the axial crystal plates 120, 150 can manipulate the polarization state of the laser beam. For example, the axial crystal plates 120, 150 may be any combination of ½ waveplates, ¼ waveplates, and ⅛ waveplates.

Further, the discrete spectrum can be arbitrarily formed to have a desired polarization distribution by changing the thickness and/or the angle of the axial crystal plates 120, 150.

Because the polarization state of the discrete spectrum significantly depends on the thickness and the angle of the axial crystal plates 120, 150, adjustment of the polarization state of the discrete spectrum can be effectively adjusted by changing the thickness and/or the angle of the axial crystal plates 120, 150.

Figure 15A:
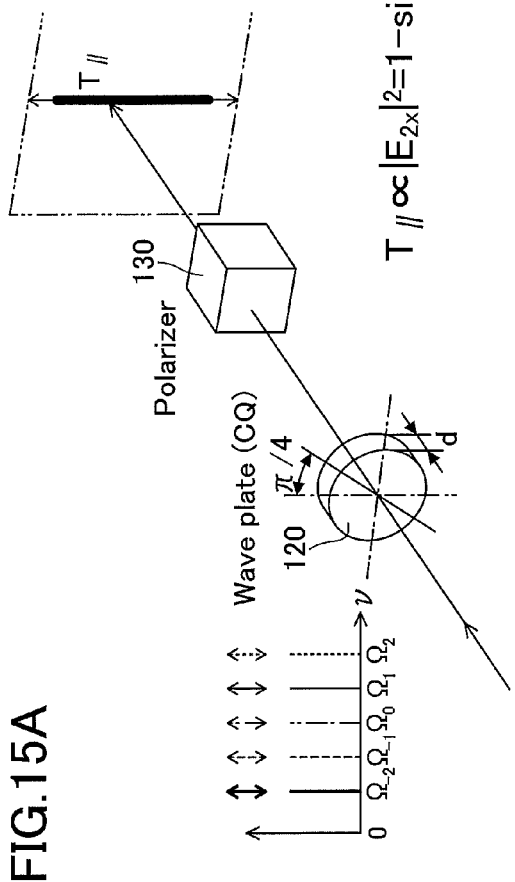
FIGS. 15A through 15C are schematic diagrams for describing an intensity of a laser beam relative to a thickness of an axial crystal plate according to an embodiment of the present invention.
Figure 15B:
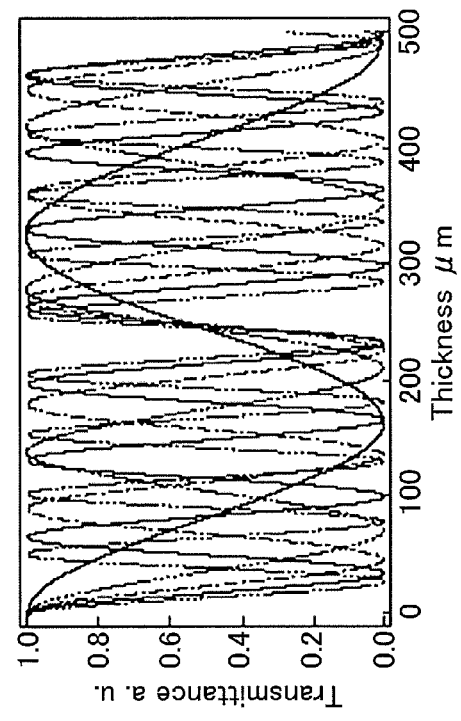
Figure 15C:
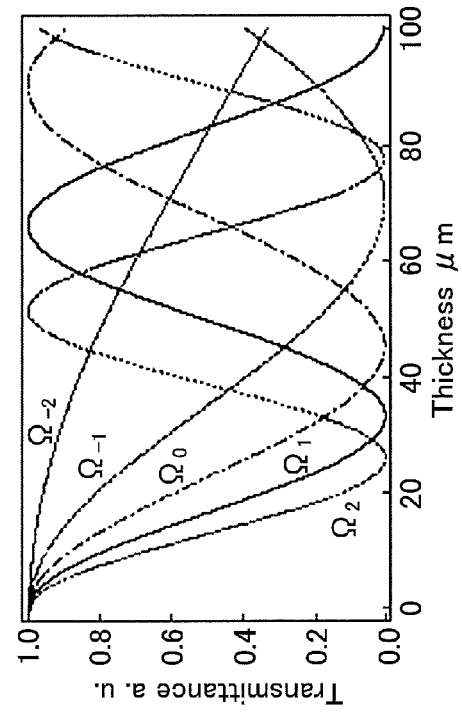

FIG. 15 includes graphs that illustrate the relationship between the thicknesses d of the axial crystal plates 120, 150 and the amount of transmittance of the discrete spectrum including discrete spectra $\Omega_{-2}$, $\Omega_{-1}$, $\Omega_0$, $\Omega_1$, and $\Omega_2$. The polarization of the incident laser beam is oriented in an orthogonal direction (direction parallel to T//) and matches with the transmitting direction of the polarizer 130. In this example, a uniaxial crystal plate (Crystal Quartz (CQ)) is used as the axial crystal plate 120. The optic axis of the uniaxial crystal plate 120 is arranged at an angle of 45 degrees relative to the orthogonal direction. According to the graphs illustrated in FIG. 15, the amount of transmittance of each spectrum significantly changes according to the thickness of the crystal plate 120. Thus, it can be understood that the polarization state of the discrete spectrum significantly changes according to the thickness of the crystal plate 120.

Figure 16A:
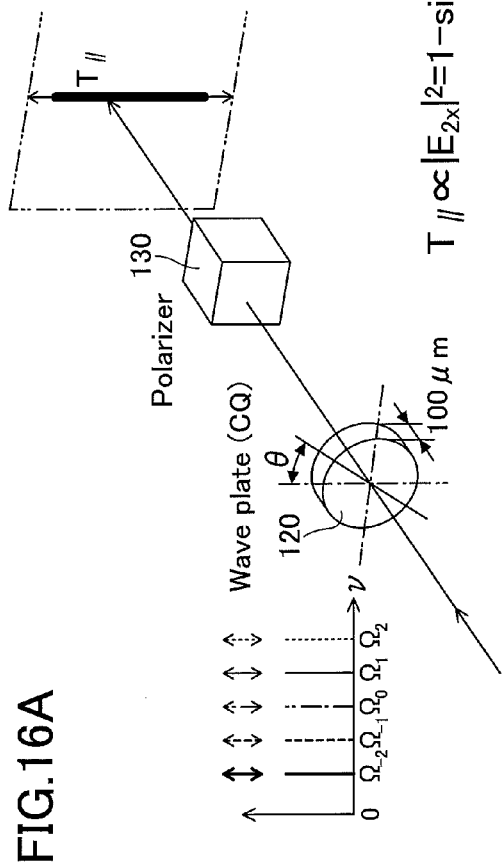
FIGS. 16A through 16C are schematic diagrams for describing an intensity of a laser beam relative to an orientation of an axial crystal plate according to an embodiment of the present invention.
Figure 16C:
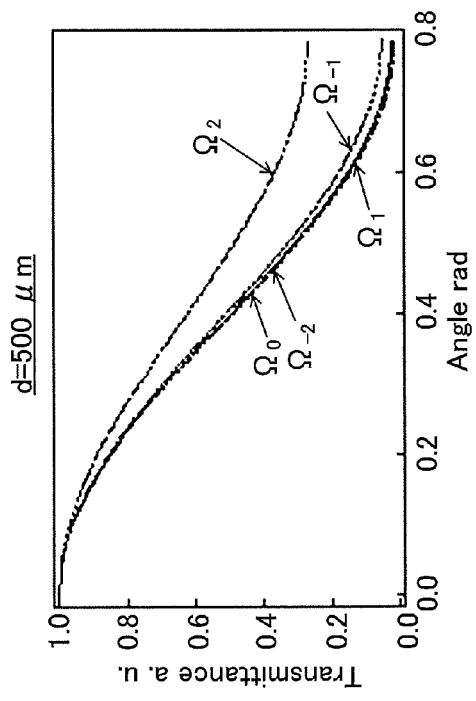
Figure 16B:
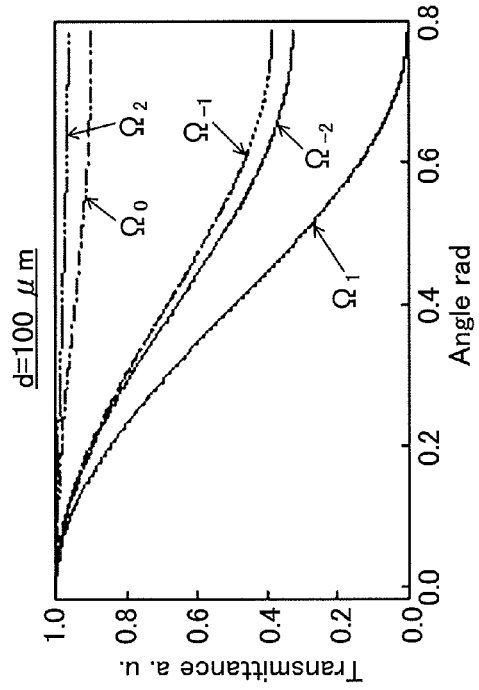

FIG. 16 includes graphs illustrating a relationship between the angle θ of the axial crystal plate 120 and the amount of transmittance of the discrete spectrum including discrete spectra $\Omega_{-2}$, $\Omega_{-1}$, $\Omega_0$, $\Omega_1$, $\Omega_2$ in a case where the axial crystal plate 120 has a fixed thickness of 100 µm. The polarization of the incident laser beam is oriented in an orthogonal direction (direction parallel to T//) and matches with the transmitting direction of the polarizer 130. In this example, a uniaxial crystal plate (Crystal Quartz (CQ)) is used as the axial crystal plate 120. According to the graphs illustrated in FIG. 16, the amount of transmittance of each spectrum significantly changes by changing the angle θ of the axial crystal plate 120. Thus, it can be understood that the polarization state of the discrete spectrum significantly changes according to the angle θ of the crystal plate 120. Note that the graph on the left side of FIG. 16 illustrates a case where the thickness d of the axial crystal plate 120 is 100 µm whereas the graph on the right side of FIG. 16 illustrates a case where the thickness d of the axial crystal plate 120 is 500 µm.

Further, each of the axial crystal plates 120, 150 may be constituted of multiple axial crystal plates according to necessity. This is because the state of polarization can be controlled more precisely by providing multiple axial crystal plates in the axial crystal plates 120, 150 in addition to the changing of the thicknesses and the angles of the axial crystal plates 120, 150.

<Polarizer>

As illustrated in FIG. 13A, the polarizer 130 used in the method of designing a laser beam according to an embodiment of the present invention is provided, so that the polarized spectrum constituting the laser beam transmitted through the axial crystal plate 120 can transmit through the polarizer 130 only if the polarized spectrum is polarized in a specific direction. The type of the polarizer 130 is not limited in particular. For example, a commercially available polarizer may be used as the polarizer 130.

Further, the polarizer 130 is preferred to include multiple polarizers 130, so that a spectrum polarized in the specific direction can be extracted with higher precision.

<Dispersive Medium>

Figure 14:
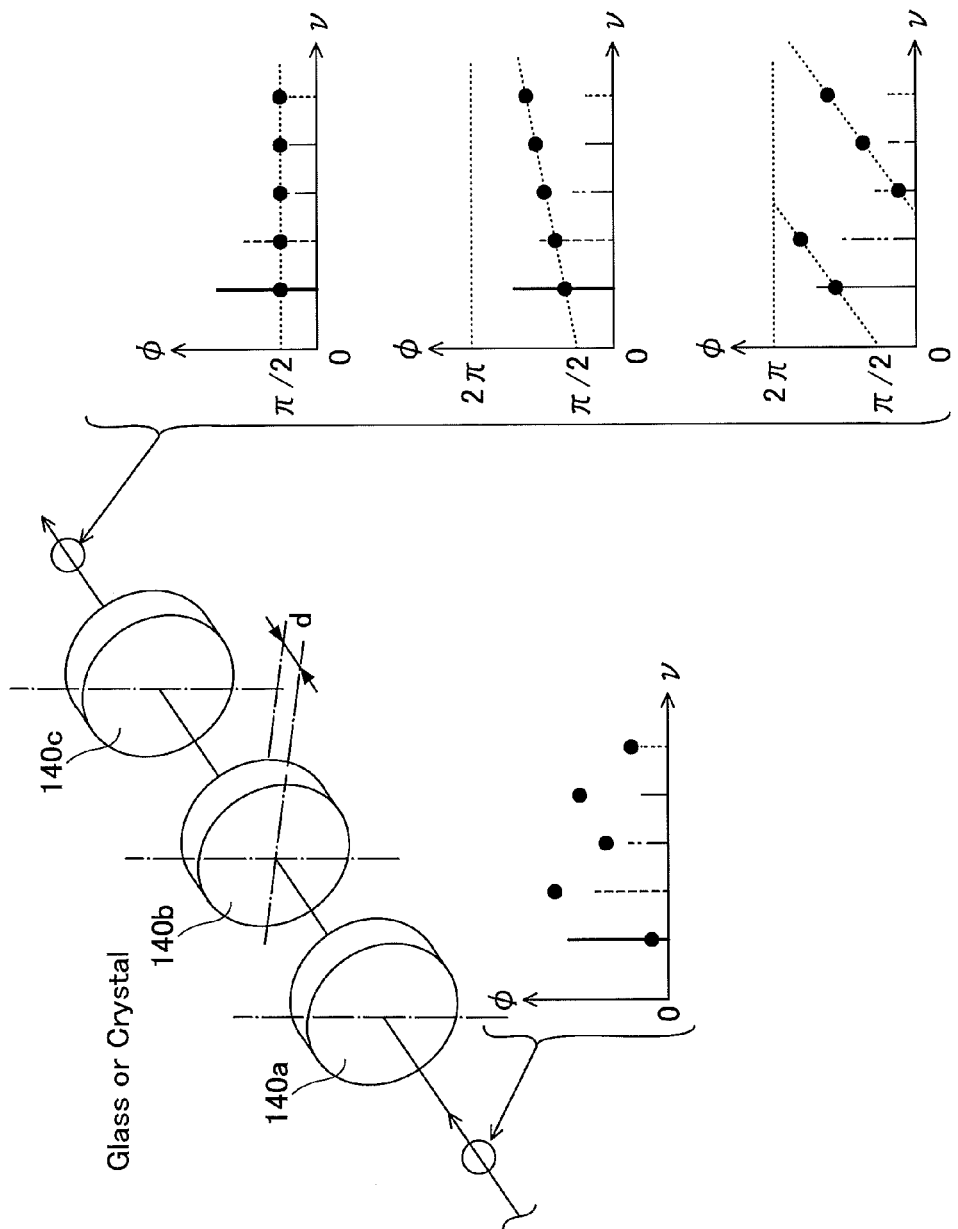
FIG. 14 is a schematic diagram illustrating phase change of discrete spectra when a laser beam is transmitted through a dispersive medium according to an embodiment of the present invention.

The dispersive medium 140 used in the linear or nonlinear optical process according to an embodiment of the present invention is transparent. As illustrated in FIG. 14, the laser beam having its spectral intensity distribution and/or its spectral polarization distribution controlled to a desired distribution is transmitted through the dispersive medium 140 (140a, 140b, 140c), so that the spectral phase of the laser beam transmitted through the dispersive medium 140 can be arbitrarily changed. Thereby, a laser beam having a desired waveform can be obtained.

Note that, although the dispersive medium 140 is to be transparent, the term "transparent" refers to a property of transmitting a laser beam. Thus, the dispersive medium 140 may include a medium having color or a clouded medium and is not required to have complete transparency (a property causing no interaction between the dispersive medium and the incident laser beam and causing absolutely no absorbing or scattering of electromagnetic waves). Further, the dispersive medium 140 may be, for example, silicate, glass, calcium fluoride, or magnesium fluoride.

As illustrated in the example of FIG. 14, the dispersive medium 140 may include multiple dispersion media 140a, 140b, 140c. In this case, the thickness d of each of the dispersion media 140a, 140b, 140c is preferred to be adjusted. By adjusting the thickness of each of the dispersion media 140a, 140b, 140c, the phase of the spectra constituting the laser beam can be manipulated. Note that the "thickness d of each of the dispersion media 140a, 140b, 140c" refers to the thickness d of each of the dispersion media 140a, 140b, 140c with respect to the direction in which the laser beam is transmitted through the dispersion media 140a, 140b, 140c".

According to an embodiment of the present invention, the position for arbitrarily manipulating the spectral intensity distribution, the spectral polarization distribution, and the spectral phase distribution of the laser beam is adjusted in the direction in which the laser beam is transmitted through the optical components of the laser device 100. By the adjustment, the linear and/or nonlinear optical property of an optical process can be manipulated, so that a desired optical process can be efficiently implemented. The reason that the manipulation can be achieved is described as follows.

Figure 19:
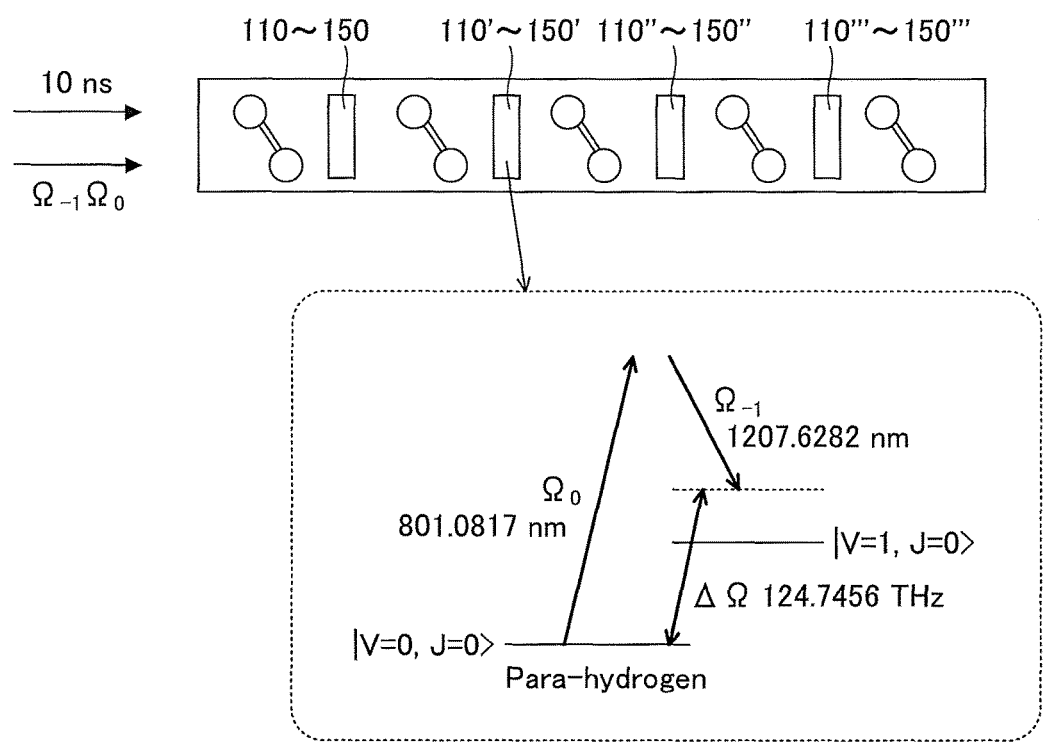
FIG. 19 is a schematic diagram for describing a manipulation of a nonlinear optical process by applying a manipulation method to a stimulated Raman process according to an embodiment of the present invention.

A stimulated Raman scattering process generated by the spectra $\Omega_0$, $\Omega_{-1}$ of the laser beam not only depends on the optical properties of the spectra $\Omega_0$, $\Omega_{-1}$ but also optical properties such as the relative intensity, phase, polarization between the stimulated Raman scattering process of high order laser beams generated in the nonlinear optical process illustrated in FIG. 19. Therefore, the method for arbitrarily manipulating the spectral intensity distribution, the spectral polarization distribution, and the spectral phase distribution can be applied to the inside of the linear and/or nonlinear optical medium. Further, by adjusting the position for applying the method for manipulating the intensity, the phase, and the polarization in a direction in which the laser beam propagates inside the linear and/or nonlinear optical medium, the linear and/or nonlinear optical process can be manipulated to efficiently implement a desired liner and/or nonlinear optical process.

<Laser Device>

Next, the laser device 100 according to this embodiment of the present invention is described.

In the laser device 100 according to an embodiment of the present invention illustrated in FIG. 12, a laser beam (arrow in FIG. 12) radiated from the light source 110 is transmitted through the axial crystal plate 120 and the polarizer 130 in this order. Then, the laser beam is preferably further transmitted through the second axial crystal plate 150. Finally, the laser beam is transmitted through the transparent dispersive medium 140.

Owing to the crystal plate 120 being capable of changing the polarized state of the laser beam and the polarizer 130 being capable of adjusting the amount of the polarized laser beam transmitted therethrough, the amplitude of the discrete spectrum (intensity distribution) of the laser beam can be controlled. Further, the polarization distribution of the discrete spectrum controlled by the crystal plate 120 and the polarizer 130 can be further controlled by allowing the laser beam to be transmitted again through the second axial crystal plate 150. Further, the phase of the discrete spectrum having its intensity distribution and polarization distribution controlled by the crystal plate 120, the polarizer 130, and the second crystal plate 150 can be manipulated by allowing the discrete spectrum to transmit through the transparent dispersive medium 140 and, if necessary, adjusting the thickness of the transparent dispersive medium 140. Thereby, the laser beam including polarized light beams can be manipulated to have a waveform of a desired shape.

Each of the components (e.g., laser beam, axial crystal plates, polarizer, dispersive medium) constituting the laser device is substantially the same as the components constituting the above-described method of designing a laser beam. Thus, further description thereof is omitted.

PRACTICAL EXAMPLES

Practical Example 1

In practical example 1, the laser device 100 was fabricated and evaluated in a case where a laser beam is incident to the nonlinear optical medium 21. As illustrated in FIG. 5, the laser device 100 includes the light source (laser source) 10, the wavelength conversion crystal 40, and one or more dispersion media 22. Note that an injection locked Ti-sapphire laser was used as the light source 10 from which a three-wavelength laser beam (801.0817 nm, 1207.6282 nm, 840.0000 nm) was radiated. A para-hydrogen gas (density: $2.6 \times 10^{18}$ cm$^{-3}$) was used as the nonlinear optical medium 21. A magnesium fluoride plate was used as the dispersive medium 22. The laser beam having the wavelength of 1207.6282 nm was generated to serve as an excitation light of a Ti-sapphire laser beam having a wavelength of 1207.6282 by using the injection-locked type parametric generation process. Further, three BBO nonlinear optical crystals serving as the wavelength conversion crystal 40 were provided between the light source 10 and the medium 20 for controlling the wavelength of the incident laser beam. The positions and the effective thicknesses of the magnesium fluoride plate inserted in the nonlinear optical medium 21 are illustrated in Table 1. The laser beams of the two wavelengths 801.0817 nm, 1207.6282 nm corresponding to $W_0'$, $W_{-1}'$ of FIG. 2A were used as pump light for exciting the oscillation of the para-hydrogen. The laser beam having a wavelength of 840.0000 nm was converted to have a wavelength of 210.0000 nm by a fourth harmonic wave BBO in the nonlinear optical crystal. The laser beam having the wavelength of 210.0000 nm corresponds to $W_0$ of FIG. 2A.

TABLE 1

| Index | Position (cm) | Thickness (mm) |
|---|---|---|
| 1 | 2.36 | 0.525910 |
| 2 | 4.93 | 0.703577 |
| 3 | 8.96 | 0.781209 |
| 4 | 10.70 | 0.929203 |
| 5 | 15.28 | 0.509021 |
| 6 | 17.53 | 0.519875 |
| 7 | 19.59 | 0.206639 |
| 8 | 21.15 | 0.206804 |
| 9 | 23.59 | 0.333486 |
| 10 | 25.31 | 0.332176 |
| 11 | 26.55 | 0.376182 |
| 12 | 27.57 | 0.358043 |
| 13 | 31.77 | 0.370169 |
| 14 | 32.84 | 0.469527 |
| 15 | 36.31 | 0.232094 |

In the fabricated laser beam 100, the position of each dispersive medium 22 in the laser transmission direction were adjusted to various values. Further, the relationship between the intensity (quantum efficiency) distribution and the length in the nonlinear optical medium 21 during the adjustment is illustrated in FIG. 3.

According to the graph of FIG. 3, a laser beam of various wavelengths are obtained by changing the conditions regarding the position of the dispersive medium 22 and the effective thickness of the dispersive medium 22. Therefore, it can be understood that a laser beam having a desired waveform can be obtained by adjusting the conditions regarding the position of the dispersive medium 22 and the effective thickness of the dispersive medium 22. Further, the measured wavelength of the laser beam was 123.5978 nm at a position where the length of the optical medium is 37.385 cm. According to the graph of FIG. 3, it can be understood that the wavelength of the laser beam significantly changes at the front side (entrance side) of the optical medium 21 and the rear side (exit side) of the optical medium 21.

Practical Example 2

Figure 11:
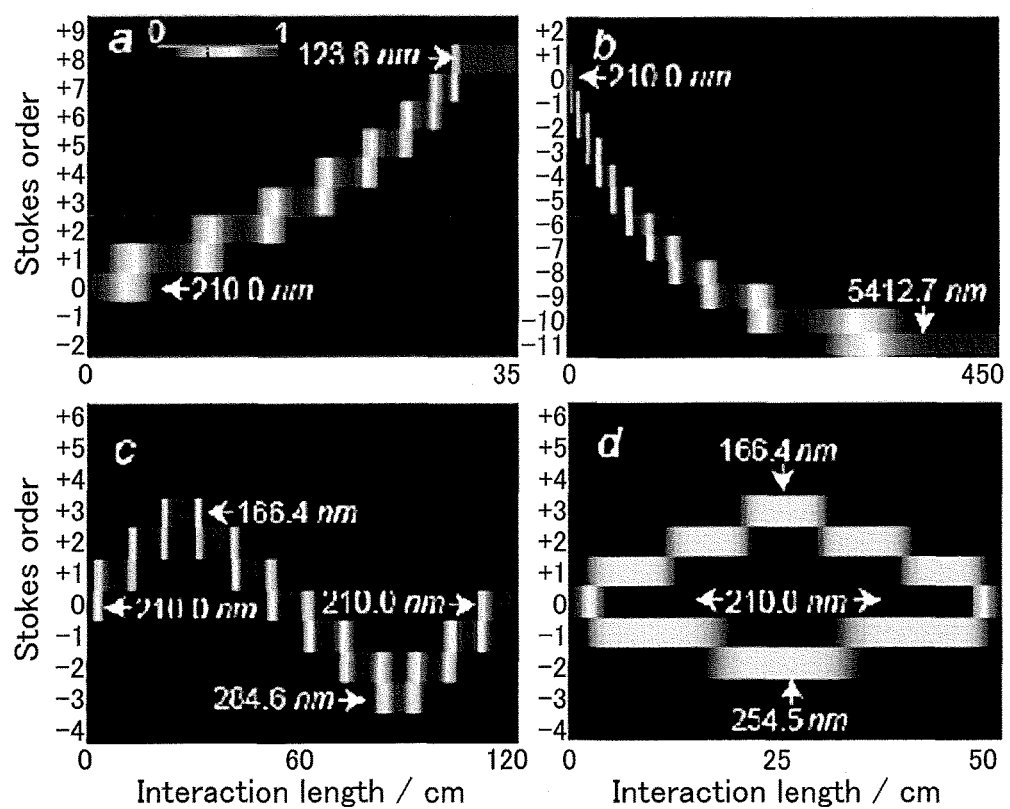
FIG. 11 is a schematic diagram illustrating an example (numerical calculation results) of artificially manipulating a nonlinear optical process by manipulating a relative phase relationship of relevant laser beams inside a medium of a stimulated Raman scattering process of FIG. 2.

For the purpose of illustrating that a laser beam having various wavelengths can be obtained by manipulating the relative phase relationship among laser beams having different frequencies, FIG. 11 illustrates the relationship between the length of the nonlinear medium 21 and the intensity (quantum efficiency) distribution of each wavelength of a laser beam obtained by adjusting the conditions of the relative phase relationship to a desired value.

According to the graph of FIG. 11, it can be understood that any nonlinear optical process can be implemented by using the above-described method according to an embodiment of the present invention.

Practical Example 3

Figure 7:
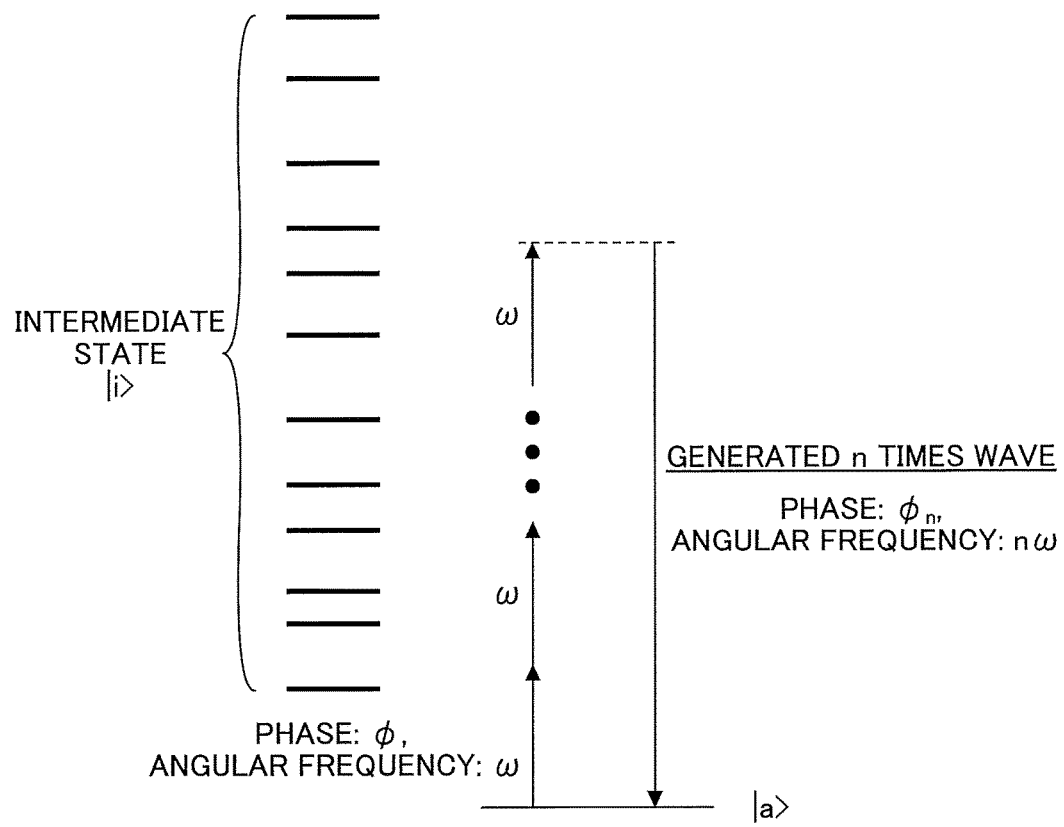
FIG. 7 is a schematic diagram illustrating a scheme for generating n (n=2, 3, 4, . . . ) multiplied waves according to an embodiment of the present invention.

FIG. 7 illustrates an example of a scheme when the above-described method is applied to a process of generating an n (n=2, 3, 4, . . . ) multiplied frequency waves.

Practical Example 4

In practical example 4, FIGS. 8A and 8B illustrate an example of a scheme when the above-described method is applied to a process of generating a sum frequency wave (see FIG. 8A) and a difference frequency wave (see FIG. 8B).

Practical Example 5

In practical example 5, FIG. 9A illustrates a configuration for applying the above-described method for efficiently sealing multiple light beams inside a resonator. FIG. 9B illustrates a configuration of efficiently implementing a desired optical process by manipulating the phase to satisfy a desired relative phase relationship for efficiently implementing a desired linear and nonlinear optical process while efficiently sealing multiple light beams in a resonator.

Practical Example 6

Figure 10:
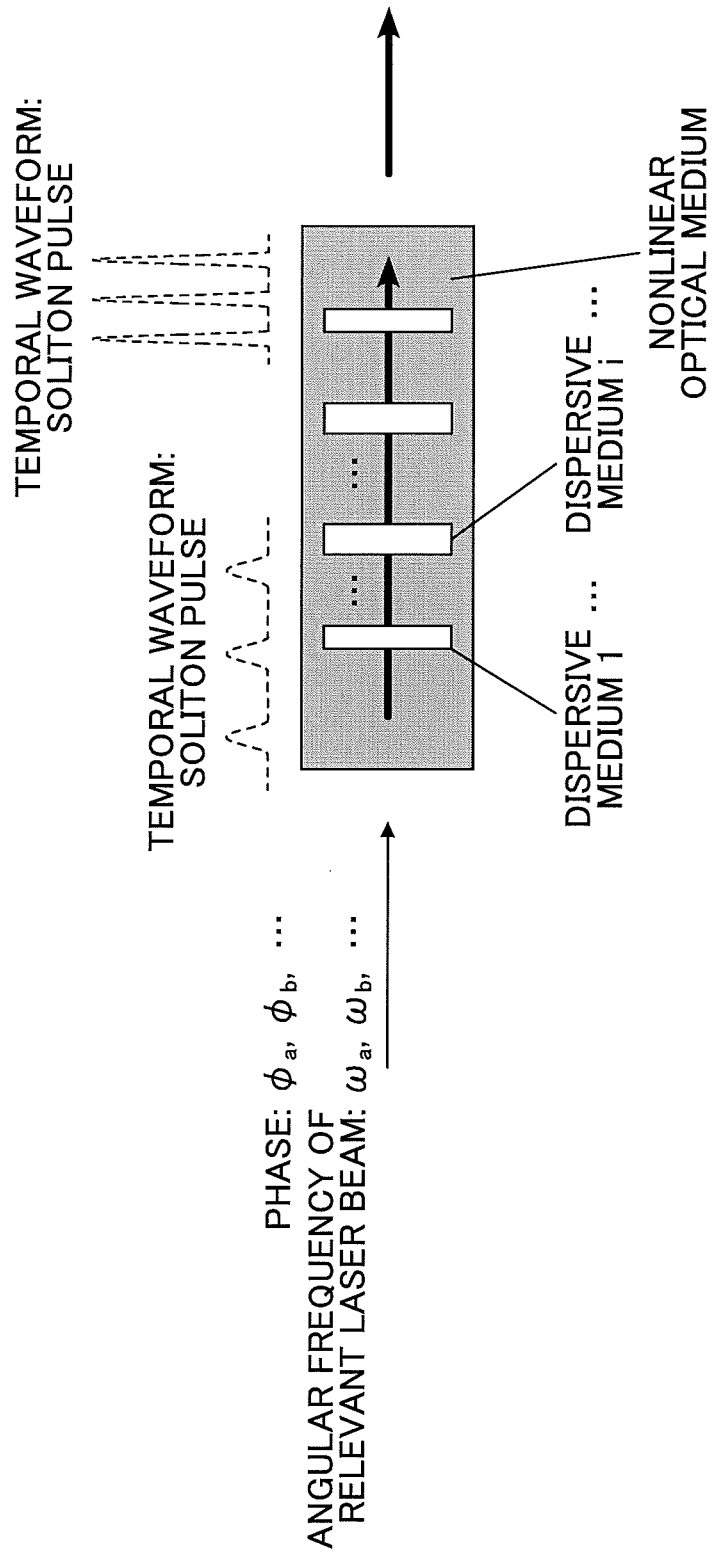
FIG. 10 is a schematic diagram illustrating a state of generating a soliton light beam by using a method according to an embodiment of the present invention.

In practical example 6, FIG. 10 illustrates an example of efficiently generating a soliton beam by applying the above-described method.

Practical Example 7

Figure 17:
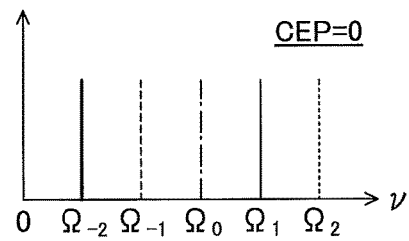
FIG. 17 is a schematic diagram illustrating a state of a discrete spectrum according to an embodiment of the present invention.

In practical example 7, a laser beam constituted by five types of discrete spectra illustrated in FIG. 17 is transmitted through the crystal plate 120, the polarizer 130, and the dispersive medium 140 (see FIG. 12) in this order. Note that, in practical example 7, a laser beam having 5 types of frequencies being capable of generating a high order stimulated Raman scattering process (see FIG. 17) was radiated from the light source 110, a single crystal plate was used as the crystal plate 120, a single magnesium fluoride polarizer was used as the polarizer 130, and a single quartz glass was used as the dispersive medium 140.

Figure 18A:
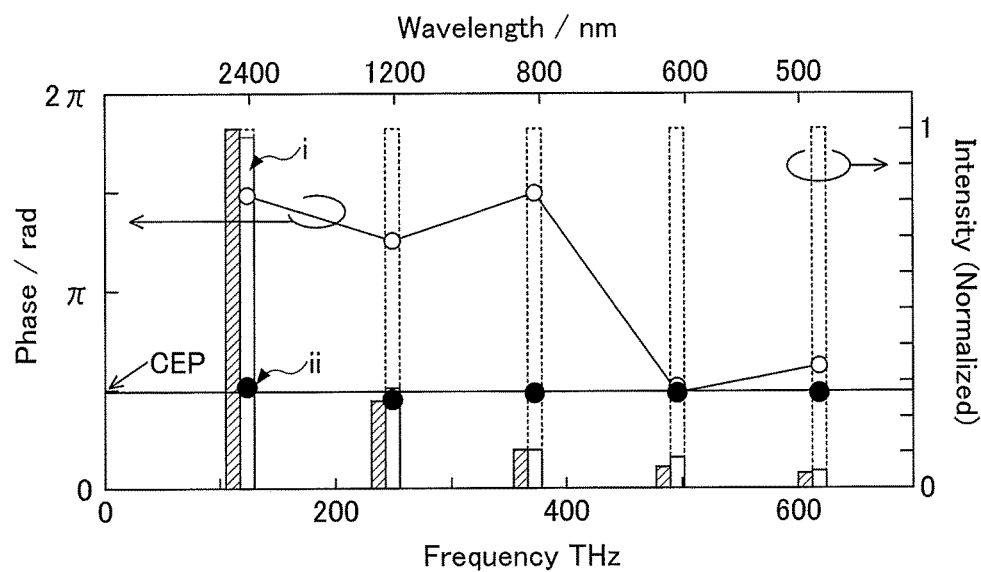
FIG. 18A is a schematic diagram illustrating the forming of an intensity distribution and a phase distribution of a discrete spectrum for generating a laser beam having a sinusoidal waveform according to an embodiment of the present invention.
Figure 18B:
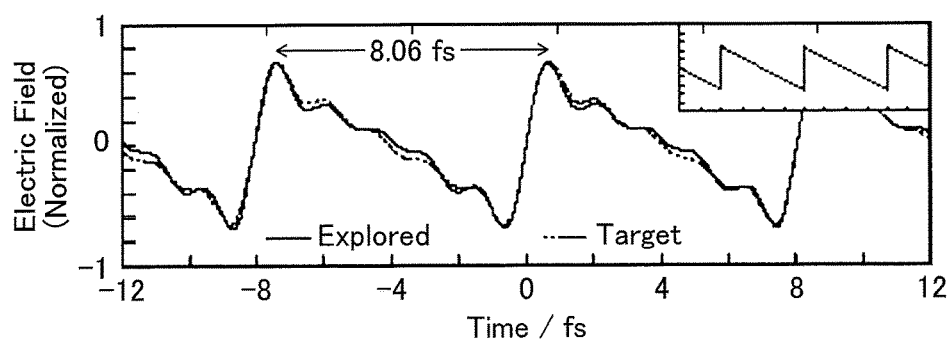
FIG. 18B is a schematic diagram illustrating a result of generating a laser beam having a sinusoidal waveform according to an embodiment of the present invention.

With the fabricated laser device 100, the axial crystal plate 120, the polarizer 130, and the dispersive medium 140 were adjusted. More specifically, the intensity distribution and the phase distribution were approximated as close as possible to an optimum intensity distribution and an optimum phase distribution for implementing a laser beam having sinusoidal waveform by adjusting the angle of the axial crystal plate relative to its axis and the effective thickness of the dispersive medium 140. FIG. 18A illustrates the intensity and phase of each spectrum of the laser beam after the adjustment. FIG. 18B illustrates the obtained waveform of the laser beam.

FIGS. 18A and 18B illustrate that a laser beam having a sinusoidal waveform can be obtained by changing the conditions of the crystal plate 120, the polarizer 130, and the dispersive medium 140, and that an intensity distribution of discrete spectra can be arbitrarily generated. Thus, with the method according to the above-described embodiment of the present invention, a laser beam having a desired shape can be obtained.

Although embodiments of a laser device have been described embodiment, the present invention is not limited to the above-described embodiments. Variations and modifications may be made without departing from the scope of the present invention.

The invention claimed is:

1. A laser device comprising:
a light source that radiates a laser beam having one or more frequencies;
a nonlinear optical medium upon which the laser beam is incident, and
at least one transparent dispersive medium arranged at specific positions(s) along a direction in the nonlinear optical medium such that the laser beam passes through the at least one transparent dispersive medium in a thickness direction thereof;
wherein the nonlinear optical medium is configured to drive a nonlinear optical process, including generation of laser beams having different frequencies, and
wherein a position of and an optical path length through the at least one dispersive medium are determined such that a phase relationship among multiple frequencies, including the different frequencies of the laser beams generated in the nonlinear optical process, satisfies a predetermined value.

2. The laser device as claimed in claim 1,
wherein the optical path length through the at least one transparent dispersive medium satisfies expressions (1) and (m-1),
wherein the expression (1) is $$\mathrm{mod}\ [\Delta\varphi_{1,2}(\omega,t')+2\pi[v_2 n_i(v_2)-v_1 n_i(v_1)]x_i/c, 2\pi] = \Delta\varphi_{1,2}^R(\omega_i+x_i,t),$$

wherein the expression (m-1) is $$\mathrm{mod}\ [\Delta\varphi_{m-1,m}(\omega_i,t')+2\pi[v_m n_i(v_m)-v_{m-1} n_i(v_{m-1})]x_i/c, 2\pi] = \Delta\varphi_{m-1,m}^R(\omega_i+x_i, t),$$

wherein "$x_i$" indicates an optical path length of an $i^{th}$ dispersive medium included in the at least one transparent dispersive medium,
wherein "$\omega_i$" indicates a position of the $i^{th}$ dispersive medium from an incident surface of the nonlinear optical medium, and
wherein "m" indicates the number of the generated laser beams having the different frequencies and is a natural number greater than or equal to 2.

3. The laser device as claimed in claim 1, wherein frequency spacings among the incident laser beam and the laser beams generated in the nonlinear optical process are greater than or equal to 10 THz.

4. The laser device as claimed in claim 1,
wherein the nonlinear optical medium is a liquid or a gas, and
wherein the at least one transparent dispersive medium is a solid.

5. A method for controlling a phase relationship among multiple frequencies of laser beams involved in a nonlinear process, comprising:

arranging at least one transparent dispersive medium at specific position(s) along a beam direction in a nonlinear optical medium;

inputting a laser beam into the nonlinear optical medium such that the laser beam passes through the at least one transparent dispersive medium in a thickness direction thereof; and causing the nonlinear optical process including generation of laser beams having different frequencies in the nonlinear optical medium, wherein a position of and an optical path length through the at least one dispersive medium are determined such that a phase relationship among multiple frequencies, including the different frequencies of the laser beams involved in the nonlinear optical process, satisfies a predetermined value.

* * * * *